US009303536B2

(12) United States Patent
Suzuki et al.

(10) Patent No.: US 9,303,536 B2
(45) Date of Patent: Apr. 5, 2016

(54) VALVE OPENING AND CLOSING CONTROL APPARATUS

(71) Applicant: AISIN SEIKI KABUSHIKI KAISHA, Kariya (JP)

(72) Inventors: Shigemitsu Suzuki, Takahama (JP); Naoto Toma, Kariya (JP); Hiroki Mukaide, Chiryu (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 650 days.

(21) Appl. No.: 13/667,652

(22) Filed: Nov. 2, 2012

(65) Prior Publication Data

US 2013/0118428 A1 May 16, 2013

(30) Foreign Application Priority Data

Nov. 4, 2011 (JP) ................... 2011-242688
Nov. 4, 2011 (JP) ................... 2011-242689
Nov. 4, 2011 (JP) ................... 2011-242690

(51) Int. Cl.
*F01L 1/00* (2006.01)
*F01L 1/344* (2006.01)
(Continued)

(52) U.S. Cl.
CPC ........... *F01L 1/3442* (2013.01); *F02D 13/0215* (2013.01); *F02D 13/0269* (2013.01); *F02D 15/00* (2013.01); *F02D 41/042* (2013.01); *F02D 41/062* (2013.01); *F02N 11/0814* (2013.01); *F02N 19/004* (2013.01); *F01L 2800/01* (2013.01); *F01L 2800/03* (2013.01); *F02D 2013/0292* (2013.01);
(Continued)

(58) Field of Classification Search
CPC .......................... F01L 1/12; F02D 2041/0012
USPC ................... 123/90.1, 90.12, 90.15, 345, 347
See application file for complete search history.

(56) References Cited

U.S. PATENT DOCUMENTS 5,924,395 A    7/1999  Moriya et al.
8,418,664 B2   4/2013  Suzuki et al.
(Continued)

FOREIGN PATENT DOCUMENTS

JP    10-227236 A    8/1998
JP    11-013429 A    1/1999
(Continued)

OTHER PUBLICATIONS

Extended European Search Report dated Feb. 15, 2013, issued by the European Patent Office in the corresponding European Application No. 12191138.2. (6 pages).
(Continued)

*Primary Examiner* — John Kwon
(74) *Attorney, Agent, or Firm* — Buchanan Ingersoll & Rooney, PC

(57) ABSTRACT

A valve opening and closing time control apparatus includes; a relative rotation angle control unit performs most delayed angle setting control of setting a relative rotation angle between a driving side rotating body and a driven side rotating body to the most delayed angle when performing an automatic stop, and most delayed angle restriction control of maintaining the relative rotation angle in the most delayed angle from a beginning of the automatic start until reaching a set timing when the automatic start-up begins, and releasing a maintenance of the most delayed angle after the setting timing.

14 Claims, 17 Drawing Sheets

(51) Int. Cl.
*F02N 11/08* (2006.01)
*F02N 19/00* (2010.01)
*F02D 41/04* (2006.01)
*F02D 41/06* (2006.01)
*F02D 13/02* (2006.01)
*F02D 15/00* (2006.01)
*F02D 41/00* (2006.01)

(52) U.S. Cl.
CPC ........ *F02D 2041/001* (2013.01); *Y02T 10/142* (2013.01); *Y02T 10/48* (2013.01)

(56) References Cited

U.S. PATENT DOCUMENTS

| | | | |
|---|---|---|---|
| 2007/0209618 A1 | 9/2007 | Leone | |
| 2008/0022953 A1* | 1/2008 | Kanada et al. | 123/90.17 |
| 2009/0025668 A1* | 1/2009 | Matsusaka et al. | 123/90.17 |
| 2010/0106355 A1 | 4/2010 | Hattori et al. | |
| 2010/0186697 A1 | 7/2010 | Suzuki et al. | |
| 2010/0313834 A1 | 12/2010 | Auchter et al. | |
| 2010/0319641 A1 | 12/2010 | Suzuki et al. | |
| 2012/0006290 A1* | 1/2012 | Noguchi et al. | 123/90.15 |

FOREIGN PATENT DOCUMENTS

| | | |
|---|---|---|
| JP | 2000-179365 A | 6/2000 |
| JP | 2004-346769 A | 12/2004 |
| JP | 2006-63835 A | 3/2006 |
| JP | 2006-347430 A | 12/2006 |
| JP | 2007-064127 A | 3/2007 |
| JP | 2010-065593 A | 3/2010 |
| JP | 2010-127181 A | 6/2010 |
| JP | 2010-196698 A | 9/2010 |
| JP | 2011-1852 A | 1/2011 |
| JP | 4609714 B2 | 1/2011 |

OTHER PUBLICATIONS

Japanese Office Action issued Jun. 18, 2015, by the Japan Patent Office, in corresponding Japanese Patent Application No. 2011-242688, and English language translation of Office Action. (6 pages).

Japanese Office Action issued Jun. 18, 2015, by the Japan Patent Office, in corresponding Japanese Patent Application No. 2011-242689, and English translation of Office Action. (8 pages).

* cited by examiner

ENGINE START SEQUENCE (2)
FIG.11A PRESSURE ACCUMULATION CONTROL VALVE
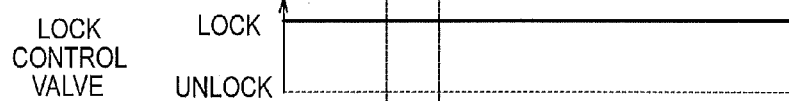
FIG.11B LOCK CONTROL VALVE
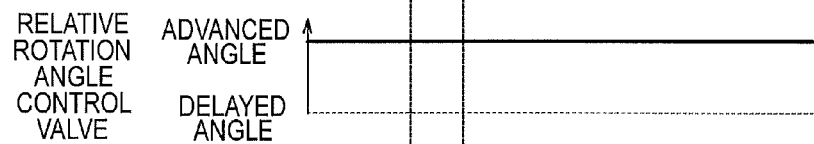
FIG.11C RELATIVE ROTATION ANGLE CONTROL VALVE
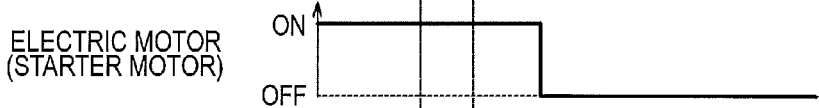
FIG.11D ELECTRIC MOTOR (STARTER MOTOR)
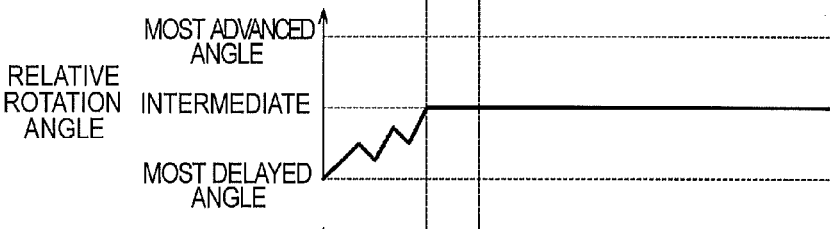
FIG.11E RELATIVE ROTATION ANGLE
FIG.11F LOCK MEMBER
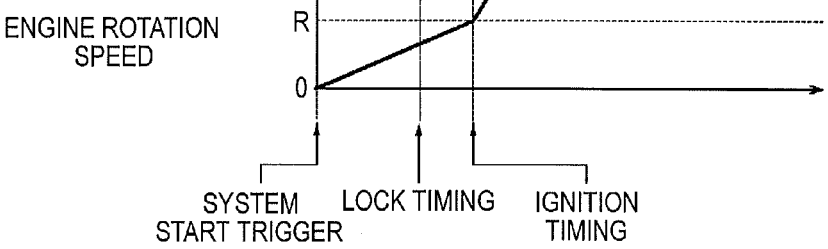
FIG.11G ENGINE ROTATION SPEED
SYSTEM START TRIGGER — LOCK TIMING — IGNITION TIMING

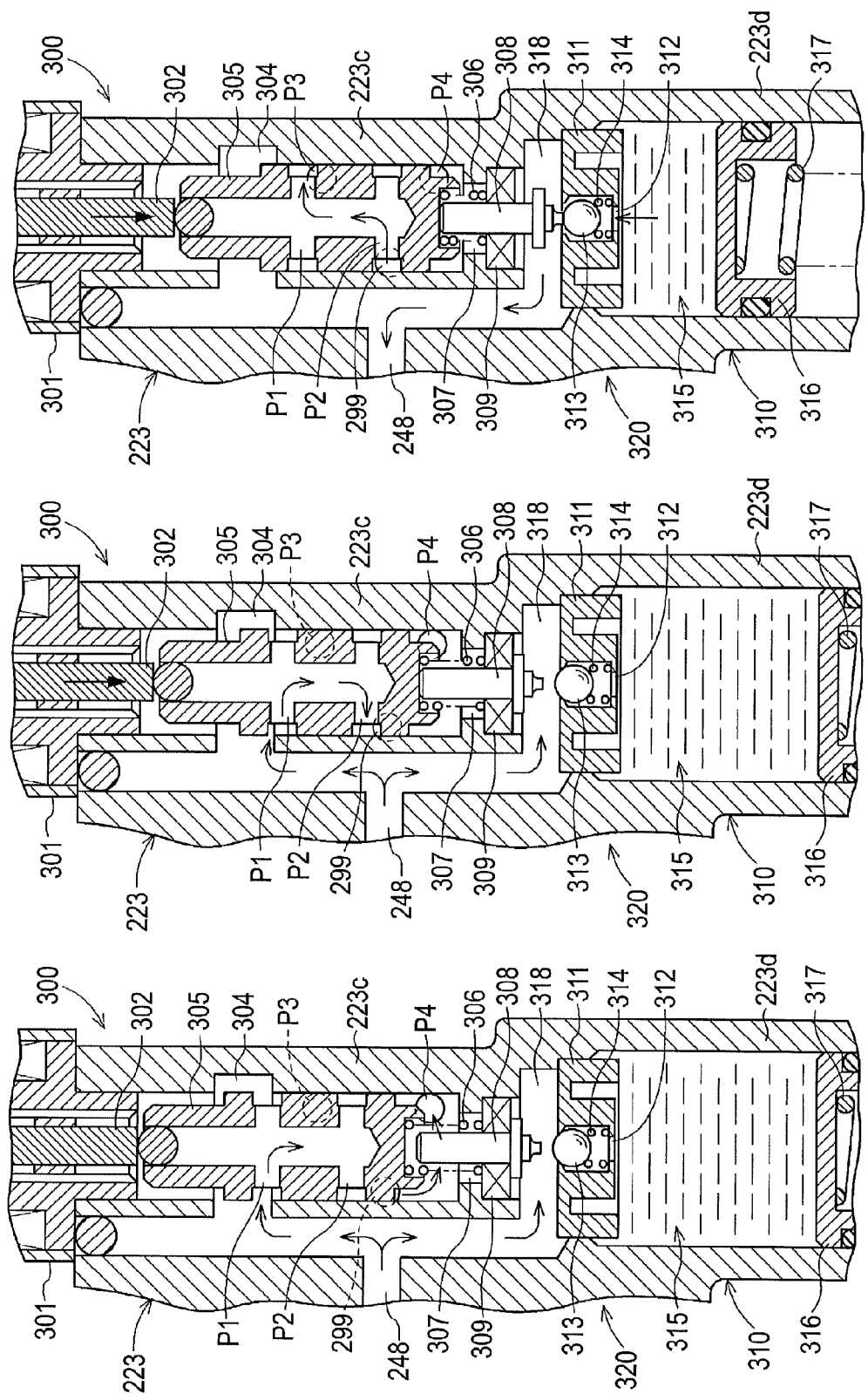

VALVE OPENING AND CLOSING CONTROL APPARATUS

CROSS REFERENCE TO RELATED APPLICATIONS

This application is based on and claims priority under 35 U.S.C. §119 to Japanese Patent Application 2010-246772, filed on Nov. 2, 2010, the entire content of which is incorporated herein by reference.

TECHNICAL FIELD

This disclosure relates to a valve opening and closing control apparatus, and more specifically, to an improvement of the valve opening and closing control apparatus that includes a driving side rotating body synchronously rotating with a crank shaft, and a driven side rotating body rotating integrally with a cam shaft of an internal combustion engine and being capable of rotating relatively with the driving side rotating body, and sets a relative rotation angle between the driving side rotating body and the driven side rotating body in a control region between the most advanced angle with the highest intake compression ratio of the internal combustion engine and the most delayed angle with the lowest intake compression ratio, in the internal combustion engine that is automatically stopped when a stop condition is established in a situation where a stop operation is not carried out by a driver, and is automatically started when a start condition is established after that.

BACKGROUND DISCUSSION

As the valve opening and closing control apparatus having the configuration as mentioned above, JP 10-227236A (Reference 1) (paragraph number [0054], FIG. 9) discloses a phase changing mechanism that includes a driving side rotating body (a housing in Reference 1) that is rotated synchronously with a crank shaft of an engine of a hybrid type vehicle, and a driven side rotating body (a member having a plurality of vanes in Reference 1) that is rotated integrally with a cam shaft. The phase changing mechanism discloses a configuration that has an advanced angle chamber formed at one side in a rotation direction based on the vane and a delayed angle chamber formed at the other side in the rotation direction, by forming a plurality of protrusion portions protruding to an axis center side inside the driving side rotating body and placing a plurality of vanes in a space formed between the plurality of protrusion portions, and has a control valve which selects one of the advanced angle chamber and the delayed angle chamber and supplies hydraulic fluid.

Reference 1 discloses that the operation of raising the intake compression ratio is carried out, by setting the relative rotation angle between the driving side rotating body and the driven side rotating body to the advanced angle side and reducing the intake compression ratio by setting the relative rotation angle to the delayed angle side, the relative rotation angle between the driving side rotating body and the driven side rotating body is set to the advanced angle side or the delayed angle side by the control of the control valve, and the relative rotation angle is controlled so as to adjust the intake timing of the internal combustion engine.

In the hybrid type vehicle, even if a driver does not perform the operation that stops the internal combustion engine, the control is performed so that when the condition is established, an ECU automatically stops the internal combustion engine, and when the condition is established after the stop, the ECU automatically starts the internal combustion engine. For such reasons, Reference 1 discloses that starting of the internal combustion engine is facilitated after that by changing the relative rotation angle mentioned above to the most delayed angle and locking the angle by a lock mechanism when stopping the internal combustion engine by the ECU.

Without being limited to the hybrid type vehicle, even in an idling stop vehicle that stops the internal combustion engine when the vehicle is temporarily stopped due to waiting for a traffic light or the like, the control of stopping the internal combustion engine and the control of starting the engine are frequently performed. Thus, when starting the internal combustion engine, it is considered that the control of setting the intake compression ratio described in Reference 1 to a low value, reducing load of a compression stroke to facilitate starting, and setting the relative rotation angle between the driving side rotating body and the driven side rotating body to the most delayed angle when stopping the internal combustion engine by the ECU so as to suppress the vibration during starting is effective.

Furthermore, in order to perform starting of the internal combustion engine by setting the relative rotation angle to the most delayed angle, it is also possible to lightly rotate the crank shaft to be connected to starting of the internal combustion engine. However, since the intake compression ratio is low, it is hard to perform suitable combustion, and it is preferable to shift the relative rotation angle to the advanced angle after starting the rotation driving of the crank shaft, in the state of locking the relative rotation angle to the most delayed angle.

However, in a configuration that includes a hydraulic pump driven by the internal combustion engine and performs unlocking of the lock mechanism by hydraulic fluid from the hydraulic pump, the timing of unlocking is delayed due to the oil pressure deficiency, it is difficult to shift the internal combustion engine to the suitable operation state, and so there is room for improvement.

Furthermore, in a configuration that does not use the lock mechanism, maintains the relative rotation angle at the most delayed angle by the oil pressure of hydraulic fluid, and then moves the relative rotation angle in the advanced angle direction, similarly, the rapid movement in the advanced angle direction is delayed due to oil pressure deficiency, it is difficult to shift the internal combustion engine to the suitable operation state, and so there is room for improvement.

An object of this disclosure is to reasonably constitute a valve opening and closing control apparatus that stabilizes the relative rotation angle immediately after starting and then is able to smoothly shift the relative rotation angle in the advanced angle direction.

SUMMARY

According to a first aspect of this disclosure, there is provided a valve opening and closing time control apparatus equipped in an internal combustion engine that is automatically stopped by an engine control portion, when a stop condition is established in a situation that a stop operation is not performed by a driver, and is automatically started by the engine control portion when a start condition is next established, the valve opening and closing time control apparatus including: a driving side rotating body that is rotated synchronously with a crank shaft of the internal combustion engine; a driven side rotating body that is rotated integrally with a camshaft of the internal combustion engine and can be relatively rotated with the driving side rotating body; an advanced angle chamber that changes a relative rotation angle between the driving side rotating body and the driven side rotating body in an advanced angle direction by supply of hydraulic fluid, and a delayed angle chamber that changes the relative rotation angle in a delayed angle direction through supply of hydraulic fluid, the advanced angle chamber and the delayed angle chamber being formed between the driving side rotating body and the driven side rotating body; and a relative rotation angle control unit that sets the relative rotation angle in a control region between the most advanced angle and the most delayed angle, wherein the relative rotation angle control unit performs most delayed angle setting control of setting the relative rotation angle between the driving side rotating body and the driven side rotating body to the most delayed angle when performing the automatic stop, and most delayed angle restriction control of maintaining the relative rotation angle in the most delayed angle from the beginning of the automatic start until reaching the set timing when the automatic start-up begins, and releasing the maintenance of the most delayed angle after the setting timing.

According to a second aspect of this disclosure, there is provided a valve opening and closing time control apparatus that is equipped in an internal combustion engine which is automatically stopped by an engine control portion, when a stop condition is established in a situation where a stop operation is not performed by a driver, and is automatically started by the engine control portion when a start condition is next established, the apparatus including:

a driving side rotating body that is rotated synchronously with a crank shaft of the internal combustion engine;

a driven side rotating body that can be rotated integrally with a camshaft of the internal combustion engine and can be relatively rotated with the driving side rotating body;

a relative rotation angle control unit that sets the relative rotation angle between the driving side rotating body and the driven side rotating body in a control region between the most advanced angle and the most delayed angle; and a most delayed angle lock mechanism that restricts the relative rotation angle to the most delayed angle, wherein the relative rotation angle control unit performs most delayed angle setting control of setting the relative rotation angle between the driving side rotating body and the driven side rotating body to the most delayed angle to set the most delayed angle lock mechanism to the locked state when performing the automatic stop, and performs the most delayed angle restriction control of maintaining the most delayed angle lock mechanism to the locked state from beginning of the automatic start until reaching a set timing when the automatic start-up begins, and unlocking the most delayed angle lock mechanism after the setting timing.

According to a third aspect of this disclosure, there is provided a valve opening and closing time control apparatus including:

a driving side rotating body that is rotated synchronously with a crank shaft of an internal combustion engine;

a driven side rotating body that is placed on the same axis so as to be relatively rotatable with the driving side rotating body, and is rotated integrally with a valve opening and closing cam shaft of the internal combustion engine;

a fluid pressure chamber that is formed in one side of the driving side rotating body and the driven side rotating body;

a partition portion that is provided at the other side of the driving side rotating body and the driven side rotating body so as to divide the fluid pressure chamber into an advanced angle chamber and a delayed angle chamber;

a relative rotation control valve that controls supply or discharge of hydraulic fluid to the advanced angle chamber or the delayed angle chamber;

an intermediate lock mechanism that has an intermediate lock flow path which is switched into a locked state where the relative rotation of the driven side rotating body to the driving side rotating body is locked at an intermediate position between the most delayed angle position and the most advanced angle position, and an unlocked state where the locked state is released;

a lock control valve that controls supply or discharge of the hydraulic fluid to the intermediate lock flow path; and a pressure accumulation control valve that controls an accumulator which supplies the hydraulic fluid to the relative rotation control valve when the internal combustion engine is started, wherein the relative rotation control valve, the lock control valve and the pressure accumulation control valve are included at a side opposite to the cam shaft with the driving side rotating body or the driven side rotating body interposed therebetween, and a solenoid that controls the lock control valve and a solenoid that controls the pressure accumulation control valve are shared.

BRIEF DESCRIPTION OF THE DRAWINGS

FIGS. 4A-4F are timing charts of an engine stop sequence in which FIG. 4A illustrates the timing chart of the pressure accumulation control valve, FIG. 4B illustrates the timing chart of the intermediate lock control valve, FIG. 4C illustrates the timing chart of the relative rotation angle control valve, FIG. 4D illustrates the timing chart of the electric motor, FIG. 4E illustrates the timing chart of the relative rotation angle, and FIG. 4F illustrates the timing chart of the crankshaft rotation speed;

FIGS. 5A-5F are timing charts of an engine start sequence in which FIG. 5A illustrates the timing chart of the pressure accumulation control valve, FIG. 5B illustrates the timing chart of the intermediate lock control valve, FIG. 5C illustrates the timing chart of the relative rotation angle control valve, FIG. 5D illustrates the timing chart of the electric motor, FIG. 5E illustrates the timing chart of the relative rotation angle, and FIG. 5F illustrates the timing chart of the crankshaft rotation speed;

FIGS. 9A-9G are timing charts of engine start sequence (1) in which FIG. 9A illustrates the timing chart of the pressure accumulation control valve, FIG. 9B illustrates the timing chart of the lock control valve, FIG. 9C illustrates the timing chart of the relative rotation angle control valve, FIG. 9D illustrates the timing chart of the electric motor, FIG. 9E illustrates the timing chart of the relative rotation angle, FIG. 9F illustrates the timing chart of the lock member, and FIG. 9G illustrates the timing chart of the engine rotation speed;

FIGS. 11A-11G are timing charts of engine start sequence (2) in which FIG. 11A illustrates the timing chart of the pressure accumulation control valve, FIG. 11B illustrates the timing chart of the lock control valve, FIG. 11C illustrates the timing chart of the relative rotation angle control valve, FIG. 11D illustrates the timing chart of the electric motor, FIG. 11E illustrates the timing chart of the relative rotation angle, FIG. 11F illustrates the timing chart of the lock member, and FIG. 11G illustrates the timing chart of the engine rotation speed;

FIGS. 17A to 17B are diagrams that illustrate the operation of a lock control valve portion and an accumulator; FIG. 17A is a state when the engine is stopped; FIG. 17B is a state when the engine is operated; and FIG. 17C is a state when the engine is started.

DETAILED DESCRIPTION

Figure 1:
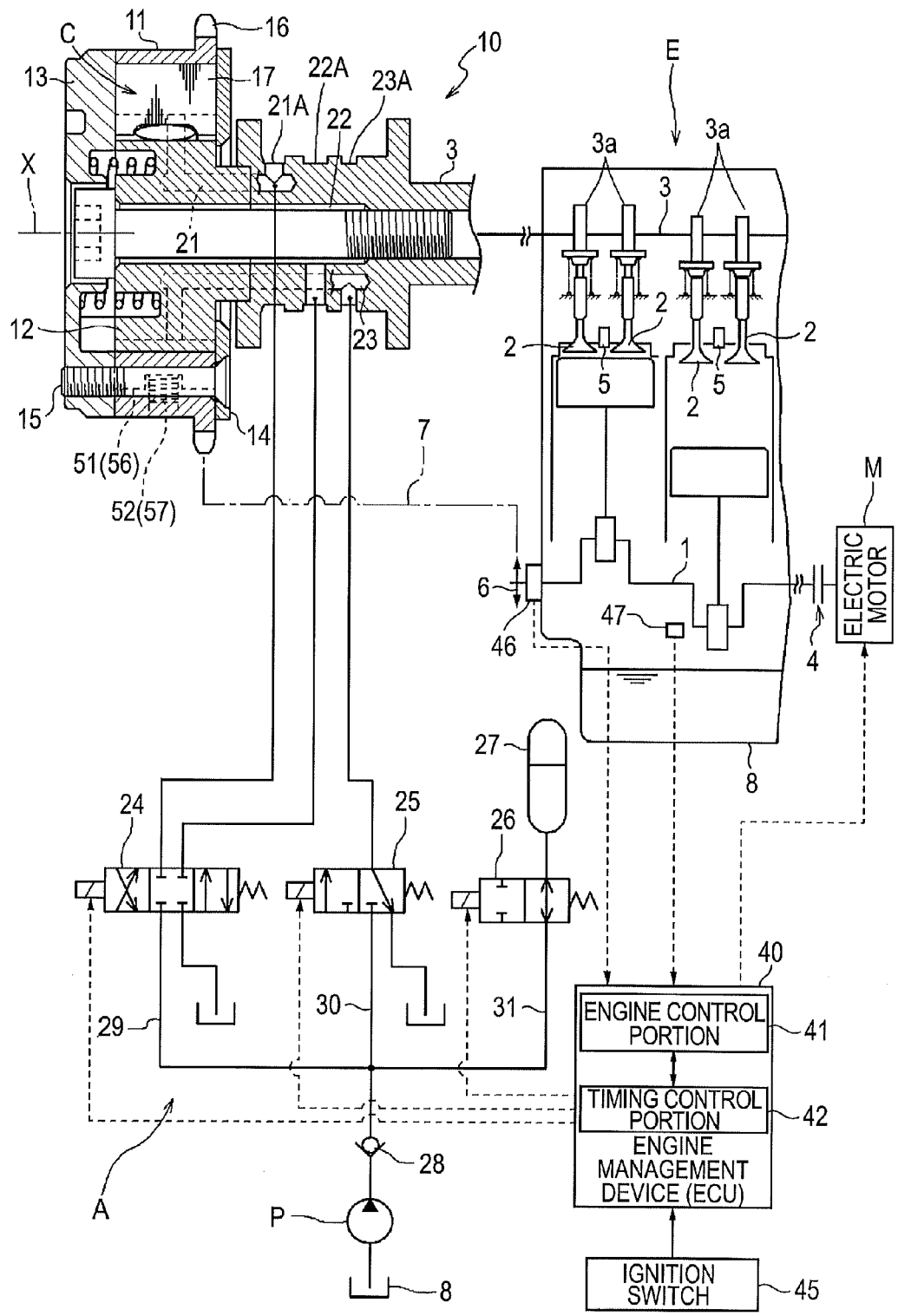
FIG. 1 is a diagram that schematically illustrates an intake timing control mechanism and a control system.
Figure 2:
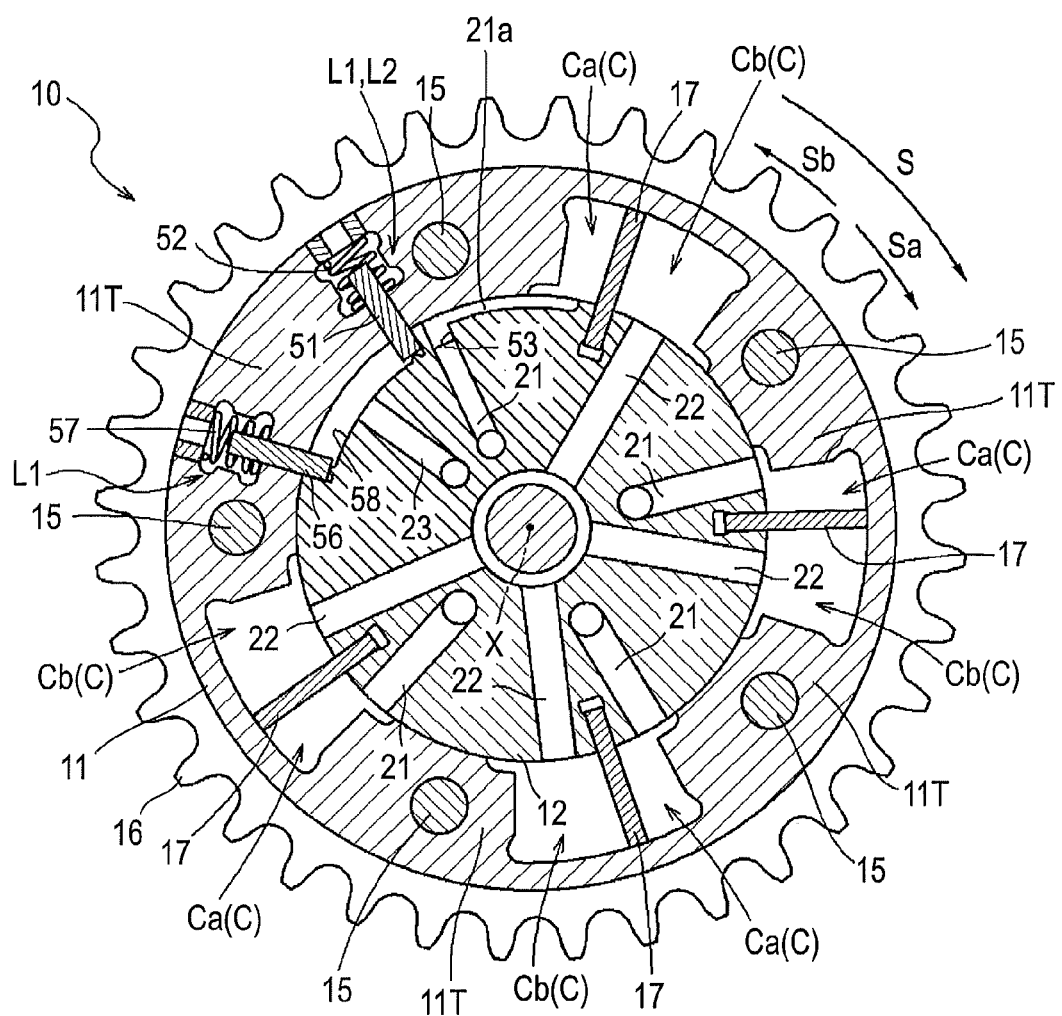
FIG. 2 is a cross-sectional view of the intake timing control mechanism that is in a lock angle.

Hereinafter, an embodiment disclosed here will be described based on the drawings.
First Embodiment
Basic Configuration As illustrated in FIGS. 1 and 2, an external rotor 11 as a driving side rotating body that is rotated synchronously with a crank shaft 1 of an engine E as an internal combustion engine is combined with an internal rotor 12 as a driven side rotating body that is rotated coaxially and integrally with a cam shaft 3 which opens and closes an intake valve 2 of a combustion chamber of the engine E around an axis center X of the cam shaft 3 in a freely relatively-rotatable manner, and thus an intake timing control mechanism 10 is formed. The intake timing control mechanism 10 controls the opening and closing time of the intake valve 2 by setting a relative rotation angle around the axis center X between the external rotor 11 and the internal rotor 12, and includes a relative rotation angle control unit A that controls a relative rotation angle between the intake timing control mechanism 10, the external rotor 11 and the internal rotor 12, and thus, a valve opening and closing control apparatus is formed.

The engine E is an Atkinson cycle engine, and is equipped in a hybrid vehicle that has a hybrid type driving mechanism referred to as a series type and a series and parallel type. The intake valve 2 is switched to a position where the valve is biased in a closing direction by a valve spring, is operated in a push-down direction by the contact of a cam portion 3a formed in the cam shaft 3 and is opened, and a position where the valve is blocked by the biasing force of the valve spring.

An electric motor M is connected to the crank shaft 1 via a main clutch 4, and the engine E including the electric motor M is managed by an engine management device 40 constituted as an ECU. The engine management device 40 performs the management of an intake system (not illustrated), a fuel supply system (not illustrated), ignition timing of an ignition plug 5, starting of the engine E using the electric motor M, stopping of the engine E or the like.

The engine management device 40 includes an engine control portion 41 consisting of software and a timing control portion 42 consisting of software. The engine control portion 41 performs the automatic start-up and the automatic stopping of the engine E. The timing control portion 42 performs the control of an amount of intake of the engine E by controlling the intake timing control mechanism 10 via the relative rotation angle control unit A. Although not specifically described, the relative rotation angle control unit A also controls the exhaust timing.

The electric motor M has a function as a starter motor that drives and rotates the crank shaft 1 by electric power from a battery (not illustrated) to start the engine E and has a function as a generator that performs the electric generation by driving force from the crank shaft 1, and the generated electric power is charged to a battery (not illustrated).

In a vehicle having a hybrid type driving mechanism, the automatic start-up and the automatic stopping of the engine E are frequently performed. The valve opening and closing control apparatus illustrated in FIG. 1 performs the control that sets the relative rotation angle to the most delayed angle so as to reduce the load of the electric motor M and perform starting in the next automatic start-up when performing the automatic stopping by the engine management device 40. Furthermore, at the time of stopping the system, the control of setting the relative rotation angle to the lock angle so as to perform stable starting when starting the engine E next is performed. A configuration and a control form for realizing the control will be described below.

Intake Timing Control Mechanism

The intake timing control mechanism 10 has a configuration in which the external rotor 11 and the internal rotor 12 are placed on the same axis center as the axis center X, the internal rotor 12 is inserted into the external rotor 11, and the rotors are inserted to a front plate 13 and a rear plate 14. The front plate 13 and the rear plate 14 are connected to the external rotor 11 by a connection bolt 15, and a timing sprocket 16 is formed on an outer periphery of the external rotor 11. A central part of the internal rotor 12 is placed in a state of passing through an opening formed in a central portion of the rear plate 14, and a front end of the camshaft 3 of the intake side is connected to the rear end at the rear end position of the internal rotor 12.

In the intake timing control mechanism 10, the external rotor 11 is rotated synchronously with the crank shaft 1 by winding an endless chain 7 throughout an output sprocket 6 provided in the crank shaft 1 of the engine E and the timing sprocket 16. Although not illustrated in the drawings, an exhaust timing control mechanism having the same configuration as that of the intake timing control mechanism 10 is also provided in the front end of the cam shaft 3 of the exhaust side, and rotational force is also transmitted to the exhaust timing control mechanism from the endless chain 7.

Figure 3:
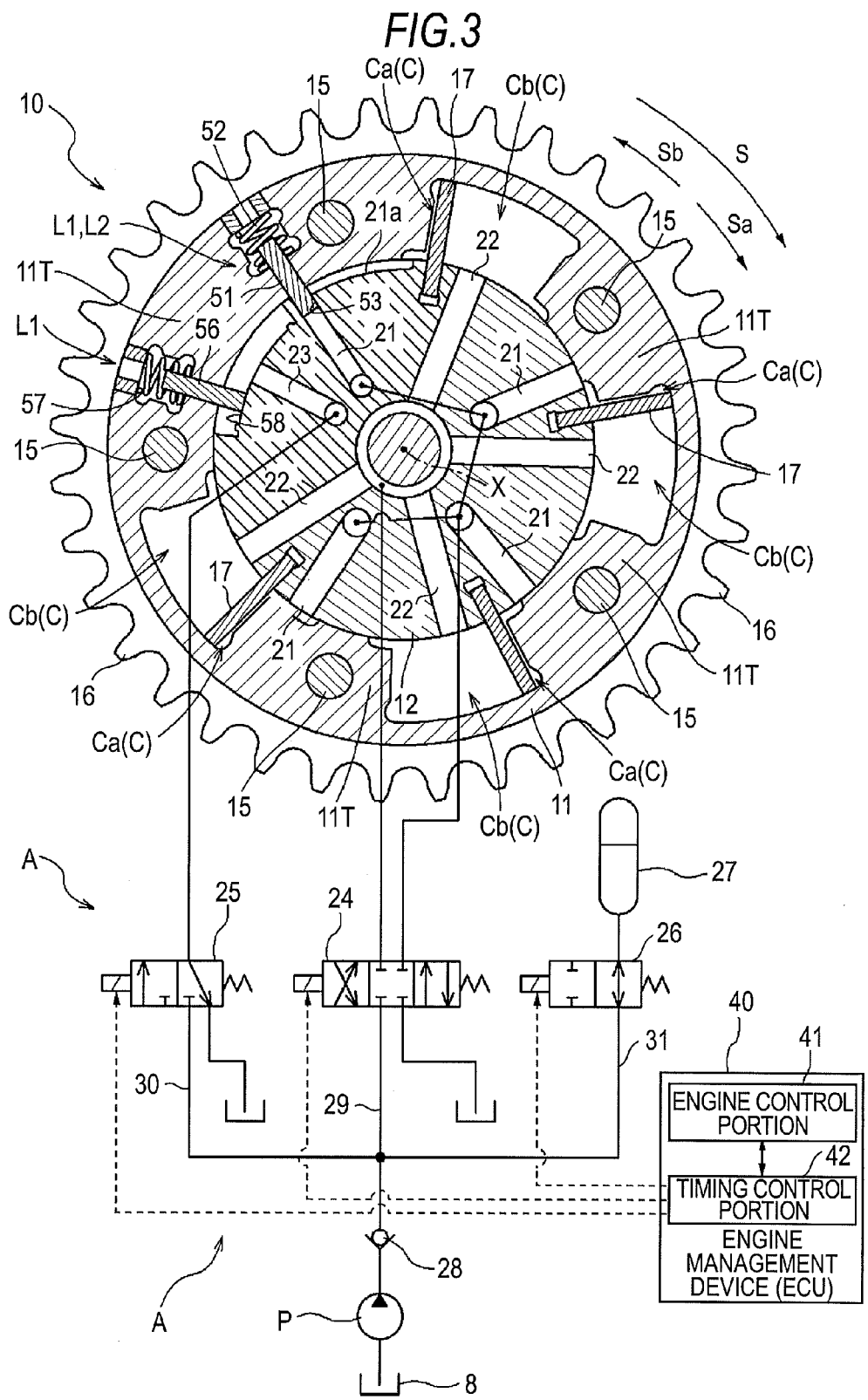
FIG. 3 is a diagram that illustrates a cross-section and a control configuration of the intake timing control mechanism that is in the most delayed angle.

As illustrated in FIGS. 2 and 3, a fluid pressure chamber C is formed between protrusion portions 11T adjacent to each other in the rotation direction by forming a plurality of protrusion portions 11T protruding toward the direction of the axis center X (inward) in the external rotor 11. The internal rotor 12 is formed in a cylindrical shaper having an outer periphery that is close to the plurality of protrusion portions 11T, and the internal rotor 12 is formed with a plurality of vanes 17 that divides the fluid pressure chamber C into two spaces in the rotation direction by being inserted to the fluid pressure chamber C.

The intake timing control mechanism 10 is configured so that the external rotor 11 is rotated toward the driving rotation direction S by driving force from the crank shaft 1. Furthermore, a direction in which the internal rotor 12 is rotated in the same direction as the driving rotation direction S with respect to the external rotor 11 is referred to as an advanced angle direction Sa, and a rotation direction in the opposite direction thereof is referred to as a delayed angle direction Sb. In the intake timing control mechanism 10, the relationship between the crank shaft 1 and the cam shaft 3 is set so as to raise the intake compression ratio with an increase of the amount of change when the relative rotation angle is changed in the advanced angle direction and reduce the intake compression ratio with an increase of the amount of change when the relative rotation angle is changed in the delayed angle direction.

Among the fluid pressure chambers C divided by the vanes 17, a space that changes the relative rotation angle to the advanced angle direction Sa by being supplied with hydraulic fluid is referred to as an advanced angle chamber Ca, and on the contrary, a space that changes the relative rotation angle to the delayed angle direction Sb by being supplied with hydraulic fluid is referred to as a delayed angle chamber Cb. The relative rotation angle in the state of the vanes 17 reaching a movement end (an oscillation end around the axis center X) in the advanced angle direction is referred to the most advanced angle, and the relative rotation angle in the state of the vanes 17 reaching a movement end (an oscillation end around the axis center X) of the delayed angle side is referred to as the most delayed angle. The relative rotation angle of the intake timing control mechanism 10 is configured so as to be settable in a control region between the most advanced angle and the most delayed angle. Furthermore, the most advanced angle is a concept that includes not only the movement end of the vane 17 in the advanced angle direction, but also the vicinity thereof. Similarly, the most delayed angle is a concept that includes not only the movement end of the vane 17 in the delayed angle direction, but also the vicinity thereof.

The intake timing control mechanism 10 includes most delayed angle lock mechanism L1 that restricts the relative rotation angle between the external rotor 11 and the internal rotor 12 to the most delayed angle, and an intermediate lock mechanism L2 that restricts the relative rotation angle to a lock angle (in the control region) between the most advanced angle and the most delayed angle.

The most delayed angle lock mechanism L1 and the intermediate lock mechanism L2 include a first lock member 51 and a second lock member 56 included so as to freely enter and exit the external rotor 11 so that the protrusion end can approach and be separated toward the axis center X in a posture perpendicular to the axis center X, and a first lock spring 52 and a second lock spring 57 as biasing mechanisms that bias the first lock member 51 and the second lock member 56 in the protrusion direction.

Furthermore, the most delayed angle lock mechanism L1 includes a first lock hole portion 53 with which the protrusion end of the first lock member 51 is engaged. The intermediate lock mechanism L2 includes a second lock hole portion 58 that is formed in a groove shape as an engagement concave portion in the outer periphery of the internal rotor 12 so that the protrusion end of the first lock member 51 and the protrusion end of the second lock member 56 are concurrently engaged with each other.

From such a configuration, in the state where the relative rotation angle between the external rotor 11 and the internal rotor 12 is restricted to the most delayed angle by the most delayed angle lock mechanism L1, the intake compression ratio is reduced, thereby reducing the load at the time of starting the engine E. Furthermore, in the state where the relative rotation angle between the external rotor 11 and the internal rotor 12 is restricted to the lock angle by the intermediate lock mechanism L2, suitable engine starting is realized even with the engine in a low temperature state, and the intake compression ratio is set which effectively operates the engine E at a low fuel efficiency. Furthermore, the most delayed angle lock mechanism L1 and the intermediate lock mechanism L2 may have, for example, a configuration in which a lock member subjected to the slide movement in the posture parallel to the axis center X is included in the internal rotor 12, and a concave portion, from which the lock member is disengaged, is formed in the front plate 13 or the rear plate 14, without being limited to the configuration mentioned above.

The internal rotor 12 is formed with an advanced angle control oil path 21 communicating with the advanced angle chamber Ca, and a delayed angle control oil path 22 communicating with the delayed angle chamber Cb. The advanced angle control oil path 21 communicates with the first lock hole portion 53, and an unlock oil path 23 communicates with the second lock hole portion 58. Furthermore, a supply oil path 21a which supplies the hydraulic fluid to the adjacent delayed angle chamber Cb from the opening portion of the first lock hole portion 53 is formed on the outer periphery of the internal rotor 12. On the outer periphery of the front end of the cam shaft 3 at the rear position of the intake timing control mechanism 10, an advanced angle control groove 21A, a delayed angle control groove 22A, and a lock control groove 23A are formed in an annular shape, and those grooves, the advanced angle control oil path 21, and the delayed angle control oil path 22, and the unlock oil path 23 communicate with each other.

Relative Rotation Angle Control Unit

As illustrated in FIGS. 1 and 3, the engine E is provided with a hydraulic pump P that sucks oil of an oil pan 8 by driving force of the engine E and sends oil as hydraulic fluid. The relative rotation angle control unit A includes an electromagnetic operation type relative rotation angle control valve 24, an electromagnetic operation type intermediate lock control valve 25 (an example of a lock control portion), an electromagnetic operation type pressure accumulation control valve 26, an accumulator 27, and an engine management device 40 (mainly, the control of the timing control portion 42) that controls the three control valves. Furthermore, in the embodiment disclosed herein, the relative rotation angle control valve 24 and the intermediate lock control valve 25 function as the lock control valve of the embodiment disclosed herein.

In the supply flow path of the hydraulic pump P, a check valve 28 is included which allows the flow of hydraulic fluid sent from the hydraulic pump P and prevents the flow of hydraulic fluid in the direction of the hydraulic pump P. A flow path system is formed which branches and divides hydraulic fluid sent from the check valve 28 into the rotation angle control oil path 29, the lock control oil path 30, and the connection oil path 31. The rotation angle control oil path 29 is connected to the relative rotation angle control valve 24, the lock control oil path 30 is connected to the intermediate lock control valve 25, and the connection oil path 31 is connected to the pressure accumulation control valve 26. Furthermore, the relative rotation angle control valve 24 is connected to the advanced angle control groove 21A and the delayed angle control groove 22A mentioned above, and the intermediate lock control valve 25 is connected to the lock control groove 23A mentioned above.

The relative rotation angle control valve 24 is configured so as to be freely operated to an advanced position where hydraulic fluid of the hydraulic pump P is supplied from the advanced angle control oil path 21 to the advanced angle chamber Ca and the hydraulic fluid of the delayed angle chamber Cb is discharged by the delayed angle control oil path 22, a delayed angle position where hydraulic fluid of the hydraulic pump P is supplied from the delayed angle control oil path 22 to the delayed angle chamber Cb and the hydraulic fluid of the advanced angle chamber Ca is discharged by the advanced angle control oil path 21, and a neutral position where hydraulic fluid is supplied to none of the advanced angle chamber Ca and the delayed angle chamber Cb.

The intermediate lock control valve 25 is configured so as to be freely operated between an unlocked position where hydraulic fluid of the hydraulic pump P is supplied from the unlock oil path 23 to the second lock hole portion 58 to unlock the intermediate lock mechanism L2, and a lock position where hydraulic fluid is discharged from the unlock oil path 23 to allow the lock of the intermediate lock mechanism L2. The pressure accumulation control valve 26 is configured so as to be freely operated between an open position where hydraulic fluid of the hydraulic pump P is supplied to the accumulator 27 or allows the delivery of hydraulic fluid of the accumulator 27, and a closed position where the supply of hydraulic fluid from the hydraulic pump P to the accumulator 27 is prevented or the delivery of hydraulic fluid of the accumulator 27 is prevented.

Control Configuration

A signal system is formed which includes an ignition switch 45 that starts the engine E, a crank shaft sensor 46 capable of measuring the rotation angle and the rotation speed of the crank shaft 1 of the engine E, and an engine temperature sensor 47 that measures the temperature of the engine E from the temperature of cooling water of the engine E. The signal system inputs the signals to the engine management device 40. Furthermore, a signal system is formed which outputs the control signal from the engine management device 40 to the electric motor M, an ignition circuit (not illustrated) driving the ignition plug 5 and a throttle control circuit (not illustrated). Moreover, a signal system is formed which outputs the control signal to the relative rotation angle control valve 24, the intermediate lock control valve 25, and the pressure accumulation control valve 26. Although not illustrated in the drawings, the signal from an accelerator sensor that measures the amount of operation of an accelerator pedal, a driving speed sensor or the like is input to the engine management device 40.

The ignition switch 45 is formed as a switch that starts the system, the system is started by an ON operation, electric power is supplied to an electric system, and a system starting state capable of performing the automatic start and the automatic stop of the engine E is provided. Furthermore, when the ignition switch 45 is subjected to an OFF operation, the system is stopped. When the engine E is in the operating state during OFF operation, the engine E is also stopped. Particularly, the signal acquired by the ON operation of the ignition switch 45 is referred to as a system starting trigger, and the signal acquired by the OFF operation thereof is referred to as a system stopping trigger. In addition, although it is assumed that the ignition switch 45 is a push operation type in which the initial push operation is subjected to the ON operation and the next push operation is subjected to the OFF operation, the ignition switch may be a rotation operation type using a key and may be a type in which the ON operation and the OFF operation are performed by the different switches.

The crank shaft sensor 46 is formed in a non-contact type that uses a magnet, a Hall element, a coil or the like. The engine temperature sensor 47 is formed using a thermistor and may measure the temperature of oil of the oil pan 8.

As mentioned above, since the electric motor M has the function of the starter motor and the function of the generator, when the battery voltage drops in the stopped state of the engine E (when the start condition is established), the automatic start-up trigger is generated, and the engine management device 40 starts the engine E by driving the electric motor M to charge the battery. Furthermore, when the battery rises up to a predetermined voltage due to charging (when the stop condition is established), the automatic stopping trigger is generated, and the engine management device 40 performs the control of stopping the engine E.

Summary of Control Form

Figure 4:
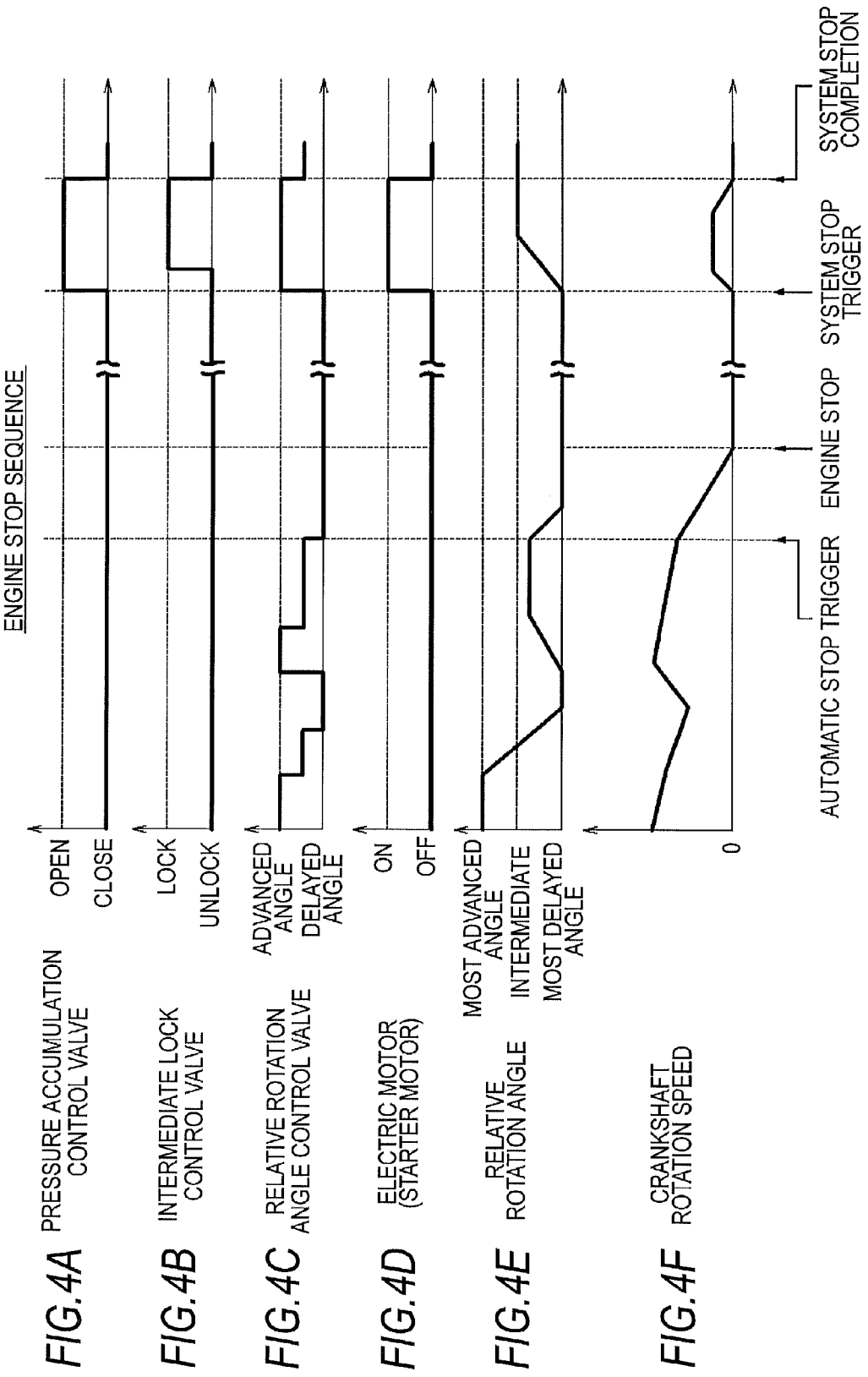

When the system is operated by the ON operation of the ignition switch 45, the stop condition is established in the operated state of the engine E, and the engine management device 40 acquires the automatic stopping trigger, the timing control portion 42 changes the relative rotation angle between external rotor 11 and the internal rotor 12 to the most delayed angle, and the engine E is stopped in the locked state using the most delayed angle lock mechanism L1. When the system is stopped by the OFF operation of the ignition switch 45 after the automatic stop, the relative rotation angle between the external rotor 11 and the internal rotor 12 is changed to the lock angle by hydraulic fluid stored in the accumulator 27 in the pressurized state, and is set to the locked state using the intermediate lock mechanism L2. The timing chart of the control form is illustrated in FIG. 4 (an engine stop sequence).

Figure 5:
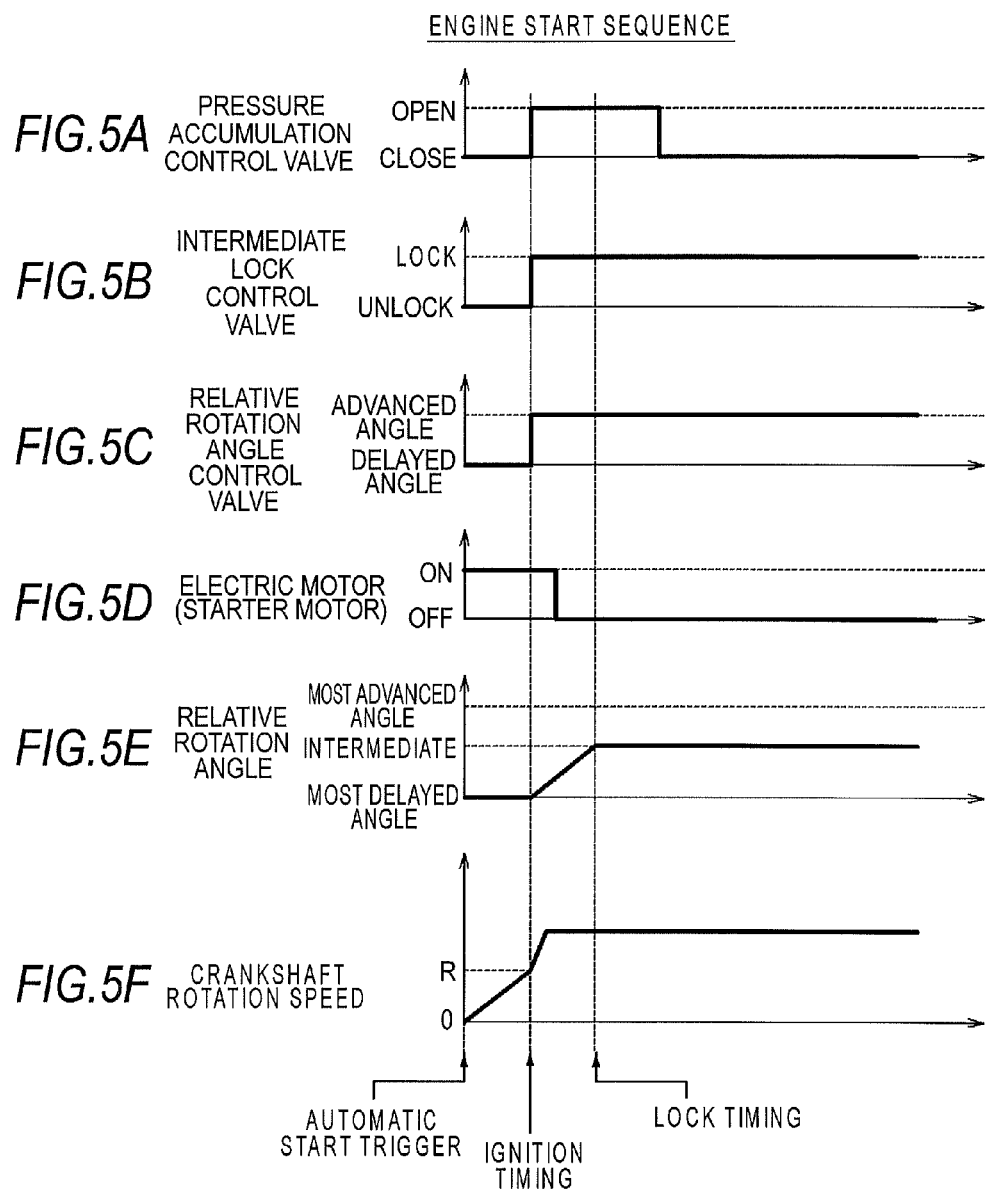

Furthermore, when the start condition is established in a situation where the system is operated (the situation that the ignition switch 45 is not turned OFF), and the engine management device 40 acquires the automatic start-up trigger, the engine E is automatically started. When performing the automatic start, if the engine temperature measured by the engine temperature sensor 47 exceeds a set value, the state where the most delayed angle lock mechanism L1 restricts the relative rotation angle to the most delayed angle during cranking is maintained up to the set timing, and then, the control of changing the relative rotation angle in the advanced angle direction is performed. The timing chart of the control form is illustrated in FIG. 5 (the engine start sequence).

Furthermore, although not illustrated as the timing chart, when performing the automatic start-up control, if the engine temperature measured by the engine temperature sensor 47 is less than the set value, as in the latter half of the control of the engine stop sequence mentioned above, the control of changing the relative rotation angle up to the lock angle during cranking, and setting the relative rotation angle to the locked state using the intermediate lock mechanism L2 is performed.

Engine Stop Sequence

As illustrated in FIG. 4, in a situation where the system is operated, the control of changing the relative rotation angle between the external rotor 11 and the internal rotor 12 by the control of the relative rotation angle control valve 24 based on the engine rotation speed, load or the like is performed. In this manner, when the stop condition is established and the engine management device 40 acquires the automatic stopping trigger in a situation where the system is operated, in a state (b) where the timing control portion 42 sets (maintains) the intermediate lock control valve 25 to the unlocked position, the relative rotation angle control valve 24 is set to the delayed angle position (c). Thereby, hydraulic fluid from the hydraulic pump P is supplied to the delayed angle chamber Cb, and the relative rotation angle is changed in the most delayed direction (e). When the relative rotation angle reaches the most delayed angle due to the change, a locked state is provided where the first lock member 51 of the most delayed angle lock mechanism L1 is engaged with the first lock hole portion 53 by the biasing force of the first lock spring 52, and then the engine control portion 41 stops the engine E (f).

The control is the most delayed angle setting control, and when the ignition switch 45 is subjected to the OFF operation after stopping the engine E by this control, in order to favorably perform starting of the engine E in a situation where the engine temperature drops next, the control of setting the relative rotation angle between the external rotor 11 and the internal rotor 12 to the lock angle is performed.

That is, when the engine management device 40 acquires the system stopping trigger after the most delayed angle setting control (when the ignition switch 45 is subjected to the OFF operation), the timing control portion 42 sets the pressure accumulation control valve 26 to the open position (a), sets the relative rotation angle control valve 24 to the advanced angle position (c), and drives the electric motor M (d). Next, at the timing when the setting time elapses after acquiring the system stopping trigger, the intermediate lock control valve 25 is operated to the lock position (b).

Thereby, hydraulic fluid stored in the accumulator 27 in the pressurized state is sent to the connection oil path 31, the rotation angle control oil path 29, the relative rotation angle control valve 24, and the advanced angle control oil path 21 and is supplied to the advanced angle chamber Ca to unlock the most delayed angle lock mechanism L1, and force of rotating the internal rotor 12 in the advanced angle direction acts. That is, by supplying hydraulic fluid from the accumulator 27 to the first lock hole portion 53 from the advanced angle control oil path 21, the first lock member 51 is pulled out from the first lock hole portion 53 to unlock the most delayed angle lock mechanism L1, and the relative rotation angle is changed in the advanced angle direction. After the change, when the relative rotation angle reaches the lock angle in the state of the intermediate lock control valve 25 being operated to the lock position, the first lock member 51 and the second lock member 56 are engaged with the second lock hole portion 58 by the biasing force of the first and second lock springs 52 and 57, whereby the intermediate lock mechanism L2 enters the locked state, and thus the relative rotation angle is restricted to the lock angle. In particular, in the control configuration of the embodiment disclosed here, since the check valve 28 prevents hydraulic fluid stored in the accumulator 27 in the pressurized state from flowing out in the direction of the hydraulic pump P, unlock of the most delayed angle lock mechanism L1 and the change of the relative rotation angle in the advanced angle direction are reliably performed, and thus can be reliably shifted to the locked state using the intermediate lock mechanism L2.

In this way, when automatically stopping the engine E, the automatic start-up of the engine E is easily performed next by restricting the relative rotation angle between the external rotor 11 and the internal rotor 12 to the most delayed angle using the most delayed angle lock mechanism L1. Furthermore, when the system is stopped after the engine E is automatically stopped, since it is also considered that the engine temperature drops when starting the engine E next and startability drops, the relative rotation angle is shifted to the state of being restricted to the lock angle using the intermediate lock mechanism L2 so as to increase startability of the engine E even at a low temperature.

Engine Start Sequence

After the engine E is stopped in the state of the most delayed angle lock mechanism L1 reaching the locked state by the engine stop sequence mentioned above, when the engine management device 40 acquires the automatic start-up trigger, as illustrated in FIG. 5, the engine control portion 41 drives the electric motor M to start cranking of the engine E (d). Through the cranking, at the timing (the ignition timing) when the rotation speed of the crank shaft 1 reaches a required rotation speed R required for ignition, the engine control portion 41 performs ignition using the ignition plug 5 (f), and the state is shifted to the operated state of the engine E.

Furthermore, at the same timing as the ignition timing, the timing control portion 42 sets the pressure accumulation control valve 26 to the open position (a), sets the intermediate lock control valve 25 to the lock position (b), sets the relative rotation angle control valve 24 to the advanced angle position (c), and immediately after that, performs the control of stopping the electric motor M.

The control is the most delayed angle restriction control. In the control, at the timing when the automatic start-up trigger is acquired, cranking is started by driving the electric motor M, and then until the rotation speed of the crank shaft 1 reaches the required rotation speed R, the most delayed angle lock mechanism L1 is maintained in the locked state. Thereby, the relative rotation angle between the external rotor 11 and the internal rotor 12 is restricted to the most delayed angle, the relative rotation angle is prevented from being disturbed, and thus, the smooth starting is realized.

Next, after the engine E is shifted to the operated state by the ignition, since the rotation speed of the engine E is low, the pressure of the hydraulic fluid supplied from the hydraulic pump P is low. However, the first lock member 51 of the most delayed angle lock mechanism L1 is operated by the pressure of the hydraulic fluid stored in the accumulator 27 in the pressurized state to release the locked state (b), and the hydraulic fluid of the accumulator 27 is supplied to the advanced angle chamber Ca. Thereby, the relative rotation angle is changed in the advanced angle direction and reaches the lock angle (e), the intermediate lock mechanism L2 reaches the locked state, and thus, it is possible to shift the engine E to the stable operation in the state of the relative rotation angle being restricted to the lock angle.

In particular, since the check valve 28 is included in the flow path that sends hydraulic fluid from the hydraulic pump P, the check valve 28 prevents hydraulic fluid stored in the accumulator 27 in the pressurized state flowing out in the direction of the hydraulic pump P, and thus it is possible to reliably perform unlocking of the most delayed angle lock mechanism L1 and the change of the relative rotation angle in the advanced angle direction.

Operation and Effects of Embodiment

In this way, in the embodiment disclosed here, when automatically stopping the engine E, the relative rotation angle between the external rotor 11 and the internal rotor 12 is changed up to the most delayed angle and is locked by the most delayed angle lock mechanism L1, and then the engine E is stopped (the most delayed angle setting control). Thereby, when the engine E is automatically started in a warm-up state where the engine temperature exceeds the set value, since the combustion chamber of the engine E is maintained at a low compression ratio, starting becomes easier, and the consumed electric power is also reduced.

After that, when performing the automatic start in a situation where the engine temperature measured by the engine temperature sensor 47 exceeds the set value, the electric motor M is controlled to perform cranking, and stable starting is performed which does not change the relative rotation angle by restricting the most delayed angle lock mechanism L1 to the locked state until the rotation speed of the crank shaft 1 reaches the required rotation speed R (the most delayed angle restricting control). In this way, since stable starting is performed which does not change the relative rotation angle, the vane 17 does not repeatedly come into contact with the protrusion portion 11T of the external rotor 11 to generate abnormal sound.

After the rotation speed of the crank shaft 1 reaches the required rotation speed R by starting, the timing control portion 42 unlocks the most delayed angle lock mechanism L1 using hydraulic fluid stored in the accumulator 27 in the pressurized state, shifts the relative rotation angle in the advanced angle direction, and makes the intermediate lock mechanism L2 enter the locked state, and thus it is possible to stably operate the engine E at the compression ratio suitable for the combustion.

Furthermore, after the engine E is automatically stopped, when a driver performs the OFF operation of the ignition switch 45, the most delayed angle lock mechanism L1 is unlocked by hydraulic fluid stored in the accumulator 27 in the pressurized state, the relative rotation angle is changed to the lock angle, and locking is performed using the intermediate lock mechanism L2. In this control, since the electric motor M is only slightly rotated, electric power is not wastefully consumed. After that, when automatically starting the engine E after a driver performs the ON operation of the ignition switch 45, since the relative rotation angle between the external rotor 11 and the internal rotor 12 is restricted to the lock angle by the intermediate lock mechanism L2, it is possible to perform starting at the compression ratio that is most suitable for the start of the engine E with a cool temperature.

Another Embodiment

The embodiment disclosed herein may be configured as below other than embodiment 1 mentioned above.

(a) When running is temporarily stopped such as waiting for a traffic light, the embodiment disclosed herein may be applied to the valve opening and closing apparatus of the engine E that stops the engine E, and so-called, performs the idle stop control. When constructed in this way, cranking is performed by the starter motor.

(b) When a driver stops the engine E by the operation of the ignition switch 45, in order to lock the relative rotation angle of the intake timing control mechanism 10 to the neutral position using the intermediate lock mechanism L2, the control form is set so as to reverse the electric motor M. Although the reversal amount of rotation is less, strong torque to the advanced angle side is generated with respect to the cam shaft by the reverse rotation, and thus it is possible to reliably lock the relative rotation angle to the lock angle.

Second Embodiment

Basic Configuration

Figure 6:
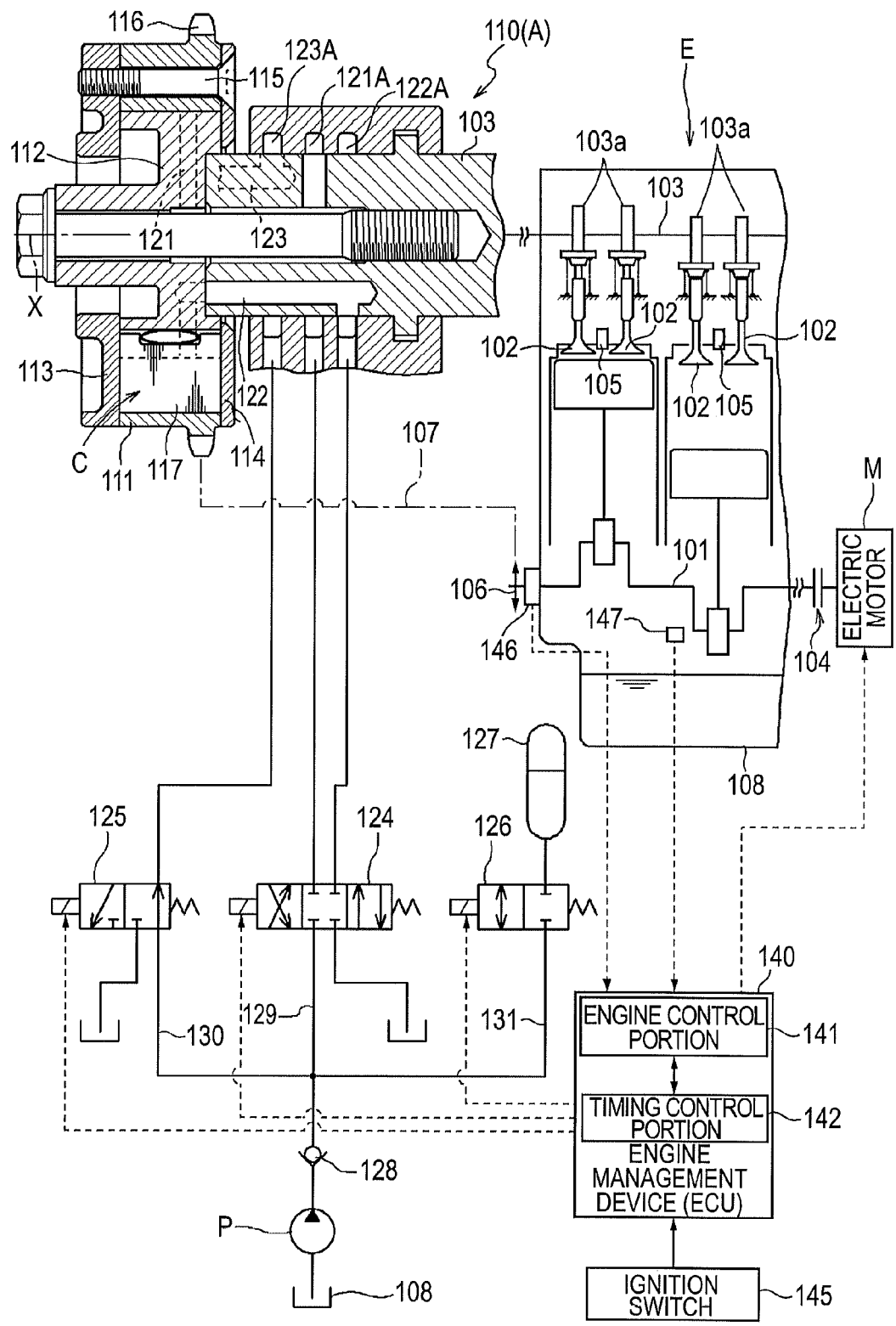
FIG. 6 is a diagram that schematically illustrates the intake timing control mechanism and a control system.
Figure 7:
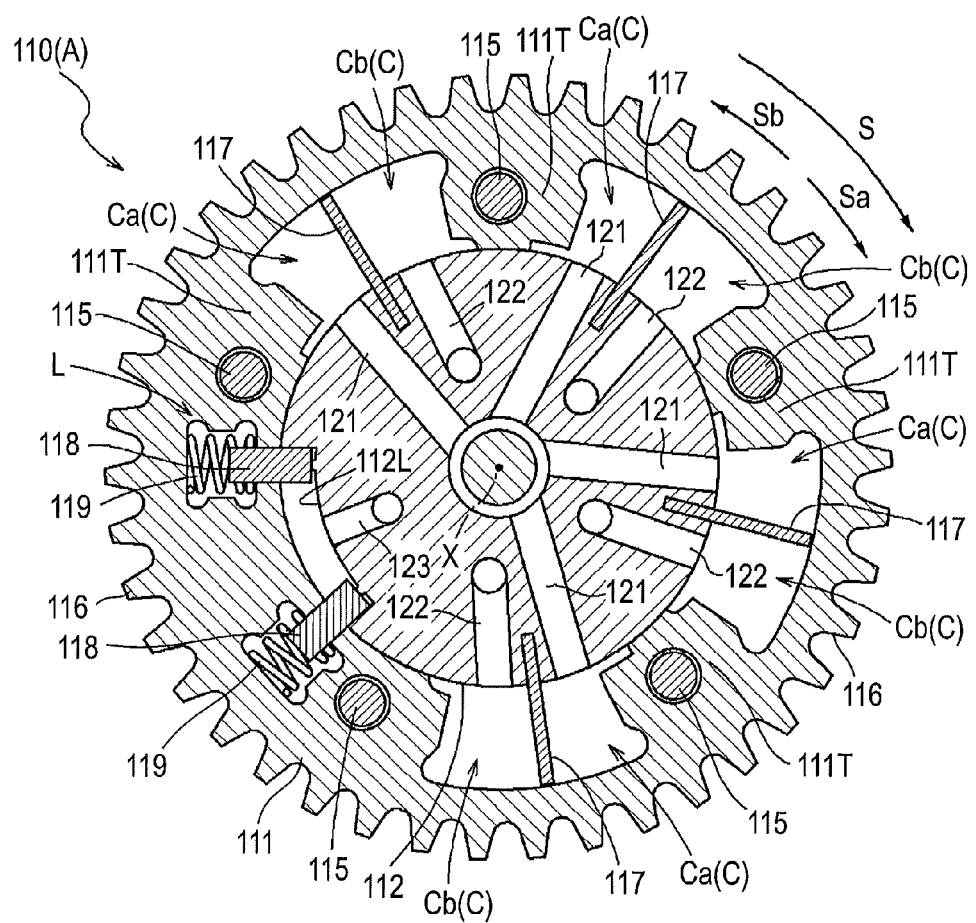
FIG. 7 is a cross-sectional view of the intake timing control mechanism that is in the lock angle.

As illustrated in FIGS. 6 and 7, an external rotor 111 as a driving side rotating body that is rotated synchronously with a crank shaft 101 of an engine E as an internal combustion engine is combined with an internal rotor 112 as a driven side rotating body that is rotated coaxially and integrally with a cam shaft 103 which opens and closes an intake valve 102 of a combustion chamber of the engine E around an axis center X of the cam shaft 103 in a freely relatively-rotatable manner, and thus an intake timing control mechanism 110 is formed. The intake timing control mechanism 110 controls the opening and closing time of the intake valve 102 by setting a relative rotation angle around the axis center X between the external rotor 111 and the internal rotor 112, and includes a relative rotation angle control unit A that controls a relative rotation angle between the intake timing control mechanism 110, the external rotor 111 and the internal rotor 112, and thus, a valve opening and closing control apparatus is formed.

The engine E is an Atkinson cycle engine, and is equipped in a hybrid type vehicle that has a hybrid type driving mechanism referred to as a series type and a series and parallel type. The intake valve 102 is switched to a position where the valve is biased in a closing direction by a valve spring, is operated in a push-down direction by the contact of a cam portion 103a formed in the cam shaft 103 and is opened, and a position where the valve is blocked by the biasing force of the valve spring.

An electric motor M is connected to the crank shaft 101 via a main clutch 104, and the engine E including the electric motor M is managed by an engine management device 140 constituted as an ECU. The engine management device 140 performs the management of an intake system (not illustrated), a fuel supply system (not illustrated), ignition timing of an ignition plug 105, starting of the engine E using the electric motor M, stopping of the engine E or the like.

The engine management device 140 includes an engine control portion 141 consisting of software, and a timing control portion 142 consisting of software. The engine control portion 141 performs the automatic start-up and the automatic stopping of the engine E. The timing control portion 142 performs the control of an amount of intake of the engine E by controlling the intake timing control mechanism 110 via the relative rotation angle control unit A. Although not specifically described, the relative rotation angle control unit A also controls the exhaust timing.

The electric motor M has a function as a starter motor that drives and rotates the crank shaft 101 by electric power from a battery (not illustrated) to start the engine E, and has a function as a generator that performs the electric generation by driving force from the crank shaft 101, and the generated electric power is charged to a battery (not illustrated).

In a vehicle having a hybrid type driving mechanism, the automatic start-up and the automatic stopping of the engine E are frequently performed. The valve opening and closing control apparatus illustrated in FIG. 6 performs the control that sets the relative rotation angle to the most delayed angle so as to reduce load of the electric motor M and perform starting in the next automatic start-up when performing the automatic stopping by the engine management device 140. Furthermore, at the time of stopping the system, the control of setting the relative rotation angle to the lock angle so as to perform stable starting when starting the engine E next is performed. A configuration and a control form for realizing the control will be described below.

Intake Timing Control Mechanism

The intake timing control mechanism 110 has a configuration in which the external rotor 111 and the internal rotor 112 are placed on the same axis center as the axis center X, the internal rotor 112 is inserted into the external rotor 111, and the rotors are inserted to a front plate 113 and a rear plate 114. The front plate 113 and the rear plate 114 are connected to the external rotor 111 by a connection bolt 115, and a timing sprocket 116 is formed on an outer periphery of the external rotor 111. A central part of the internal rotor 112 is placed in a state of passing through an opening formed in a central portion of the rear plate 114, and a front end of the cam shaft 103 of the intake side is connected to the rear end at the rear end position of the internal rotor 112.

In the intake timing control mechanism 110, the external rotor 111 is rotated synchronously with the crank shaft 101 by winding an endless chain 7 throughout an output sprocket 106 provided in the crank shaft 101 of the engine E and the timing sprocket 116. Although not illustrated in the drawings, an exhaust timing control mechanism having the same configuration as that of the intake timing control mechanism 110 is also provided in the front end of the cam shaft 103 of the exhaust side, and rotational force is also transmitted to the exhaust timing control mechanism from the endless chain 107.

Figure 8:
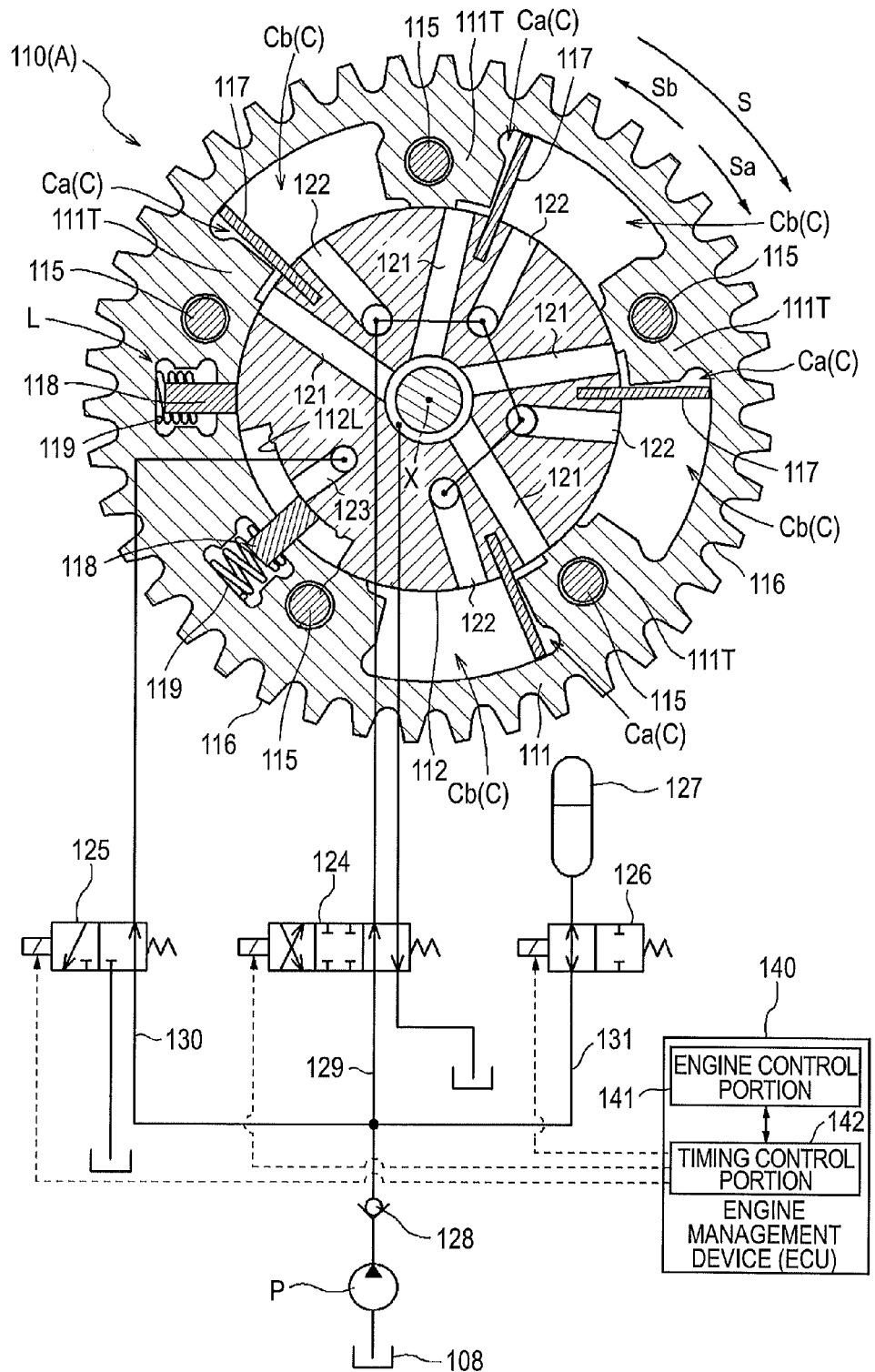
FIG. 8 is a diagram that illustrates a cross-section and a control configuration of the intake timing control mechanism at the beginning of engine start sequence (1)

As illustrated in FIGS. 7 and 8, a fluid pressure chamber C is formed between protrusion portions 111T adjacent to each other in the rotation direction by forming a plurality of protrusion portions 111T protruding toward the direction of the axis center X (inward) in the external rotor 111. The internal rotor 112 is formed in a cylindrical shaper having an outer periphery that is close to the plurality of protrusion portions 111T, and the internal rotor 112 is formed with a plurality of vanes 117 that divides the fluid pressure chamber C into two spaces in the rotation direction by being inserted to the fluid pressure chamber C.

The intake timing control mechanism 110 is configured so that the external rotor 111 is rotated toward the driving rotation direction S by driving force from the crank shaft 101. Furthermore, the direction in which the internal rotor 112 is rotated in the same direction as the driving rotation direction S with respect to the external rotor 111 is referred to as an advanced angle direction Sa, and a rotation direction in the opposite direction thereof is referred to as a delayed angle direction Sb. In the intake timing control mechanism 110, the relationship between the crank shaft 101 and the cam shaft 103 is set so as to raise the intake compression ratio with an increase of the amount of change when the relative rotation angle is changed in the advanced angle direction and reduce the intake compression ratio with an increase of the amount of change when the relative rotation angle is changed in the delayed angle direction.

Among the fluid pressure chambers C divided by the vanes 117, a space that changes the relative rotation angle to the advanced angle direction Sa by being supplied with hydraulic fluid is referred to as an advanced angle chamber Ca, and on the contrary, a space that changes the relative rotation angle to the delayed angle direction Sb by being supplied with hydraulic fluid is referred to as a delayed angle chamber Cb. The relative rotation angle in the state of the vanes 117 reaching a movement end (an oscillation end around the axis center X) in the advanced angle direction is referred to the most advanced angle, and the relative rotation angle in the state of the vanes 117 reaching a movement end (an oscillation end around the axis center X) in the delayed angle direction is referred to as the most delayed angle. The relative rotation angle of the intake timing control mechanism 110 is configured so as to be settable in a control region between the most advanced angle and the most delayed angle. Furthermore, the most advanced angle is a concept that includes not only the movement end of the vane 117 in the advanced angle direction, but also the vicinity thereof. Similarly, the most delayed angle is a concept that includes not only the movement end of the vane 117 in the delayed angle direction, but also the vicinity thereof.

The intake timing control mechanism 110 includes an intermediate lock mechanism L that restricts the relative rotation angle between the external rotor 111 and the internal rotor 112 to a lock angle (in the control region) between the most advanced angle and the most delayed angle. The intermediate lock mechanism L includes a pair of lock members 118 that is included so as to freely enter and exit the external rotor 111 so that the protrusion end thereof can approach and be separated toward the axis center X in a posture perpendicular to the axis center X, a lock spring 119 that biases the respective lock members 118 in the protrusion direction, and a lock groove portion 112L that is formed on the outer periphery of the internal rotor 112 so that the lock members 118 are disengaged therefrom.

In the intermediate lock mechanism L, in the state where the relative rotation angle between the external rotor 111 and the internal rotor 112 is restricted to the lock angle so that the pair of lock members 118 and the lock groove portion 112L are concurrently engaged, the suitable engine starting is realized even with the engine in a low temperature state, and the intake compression ratio is set which effectively operates the engine E at a low fuel efficiency. Furthermore, the intermediate lock mechanism L may have, for example, a configuration in which a lock member subjected to the slide movement in the posture parallel to the axis center X is included in the internal rotor 112, and a concave portion, from which the lock member is disengaged, is formed in the front plate 113 or the rear plate 114, without being limited to the configuration mentioned above.

The internal rotor 112 is formed with an advanced angle control oil path 121 communicating with the advanced angle chamber Ca, a delayed angle control oil path 122 communicating with the delayed angle chamber Cb, and an unlock oil path 123 communicating with the lock groove portion 112L. Furthermore, on the outer periphery of the front end of the camshaft 103, an advanced angle control groove 121A, a delayed angle control groove 122A, and a lock control groove 123A are formed in an annular shape, and those grooves, the advanced angle control oil path 121, and the delayed angle control oil path 122, and the unlock oil path 123 communicate with each other.

Relative Rotation Angle Control Unit

As illustrated in FIGS. 6 and 8, the engine E is provided with a hydraulic pump P that intakes oil of an oil pan 108 by driving force of the engine E and sends oil as hydraulic fluid. The relative rotation angle control unit A includes an electromagnetic operation type relative rotation angle control valve 124, an electromagnetic operation type lock control valve 125 (an example of a lock control portion), an electromagnetic operation type pressure accumulation control valve 126, an accumulator 127, and an engine management device 140 (mainly, the control of the timing control portion 142) that controls the three control valves.

In the supply flow path of the hydraulic pump P, a check valve 128 is included which allows the flow of hydraulic fluid that is sent from the hydraulic pump P, and prevents the flow of hydraulic fluid in the direction of the hydraulic pump P. A flow path system is formed which branches and divides hydraulic fluid that is sent from the check valve 128 into the rotation angle control oil path 129, the lock control oil path 130, and the connection oil path 131. The rotation angle control oil path 129 is connected to the relative rotation angle control valve 124, the lock control oil path 130 is connected to the lock control valve 125, and the connection oil path 131 is connected to the pressure accumulation control valve 126. Furthermore, the relative rotation angle control valve 124 is connected to the advanced angle control groove 121A and the delayed angle control groove 122A mentioned above, and the lock control valve 125 is connected to the lock control groove 123A mentioned above.

The relative rotation angle control valve 124 is configured so as to be freely operated between an advanced angle position where hydraulic fluid of the hydraulic pump P is supplied from the advanced angle control oil path 121 to the advanced angle chamber Ca and the hydraulic fluid of the delayed angle chamber Cb is discharged by the delayed angle control oil path 122, a delayed angle position where hydraulic fluid of the hydraulic pump P is supplied from the delayed angle control oil path 122 to the delayed angle chamber Cb and the hydraulic fluid of the advanced angle chamber Ca is discharged by the advanced angle control oil path 121, and a neutral position where hydraulic fluid is supplied to neither of the advanced angle chamber Ca and the delayed angle chamber Cb.

The lock control valve 125 is configured so as to be freely operated between an unlocked position where hydraulic fluid of the hydraulic pump P is supplied from the unlock oil path 123 to the lock groove portion 112L to perform unlocking, and a lock position where hydraulic fluid is discharged from the lock groove portion 112L to allow locking. The pressure accumulation control valve 126 is configured so as to be freely operated between an open position where hydraulic fluid of the hydraulic pump P is supplied (allowed to be supplied or discharged) to the accumulator 127, and a closed position where the supply of hydraulic fluid from the hydraulic pump P to the accumulator 127 is prevented (not allowed to be supplied or discharged).

Control Configuration

A signal system is formed which includes an ignition switch 145 that starts the engine E, a crank shaft sensor 146 capable of measuring the rotation angle and the rotation speed of the crank shaft 101 of the engine E, and an engine temperature sensor 147 that measures the temperature of the engine E from the temperature of cooling water of the engine E. The signal system which inputs the signals from the components to the engine management device 140 is formed. Furthermore, a signal system is formed which outputs the control signal from the engine management device 140 to the electric motor M, an ignition circuit (not illustrated) driving the ignition plug 105 and a throttle control circuit (not illustrated). Moreover, a signal system is formed which outputs the control signal to the relative rotation angle control valve 124, the lock control valve 125, and the pressure accumulation control valve 126. Although not illustrated in the drawings, the signal from an accelerator sensor that measures an amount of operation of an accelerator pedal, a driving speed sensor or the like is input to the engine management device 140.

The ignition switch 145 is formed as a switch that starts the system, the system is started by an ON operation, electric power is supplied to an electric system, and a system starting state capable of performing the automatic start and the automatic stop of the engine E is provided. Furthermore, when the ignition switch 145 is subjected to an OFF operation, the system is stopped. When the engine E is in the operating state during OFF operation, the engine E is also stopped. Particularly, the signal acquired by the ON operation of the ignition switch 145 is referred to as a system starting trigger. In addition, although it is assumed that the ignition switch 145 is a push operation type in which the initial push operation is subjected to the ON operation and the next push operation is subjected to the OFF operation, the ignition switch may be a rotation operation type using a key and may be a type in which the ON operation and the OFF operation are performed by the different switches.

Furthermore, the crank shaft sensor 146 is formed in a non-contact type that uses a magnet, a Hall element, a coil or the like. The engine temperature sensor 147 is formed using a thermistor and may measure the temperature of the oil of the oil pan 108.

As mentioned above, since the electric motor M has the function of the starter motor and the function of the generator, when the battery voltage drops in the stopped state of the engine E (when the start condition is established), the automatic start-up trigger is generated, and the engine management device 140 starts the engine E by driving the electric motor M to charge the battery. Furthermore, when the battery rises up to a predetermined voltage due to charging (when the stop condition is established), the automatic stopping trigger is generated, and the engine management device 140 performs the control of stopping the engine E.

Summary of Control Form

Figure 9:
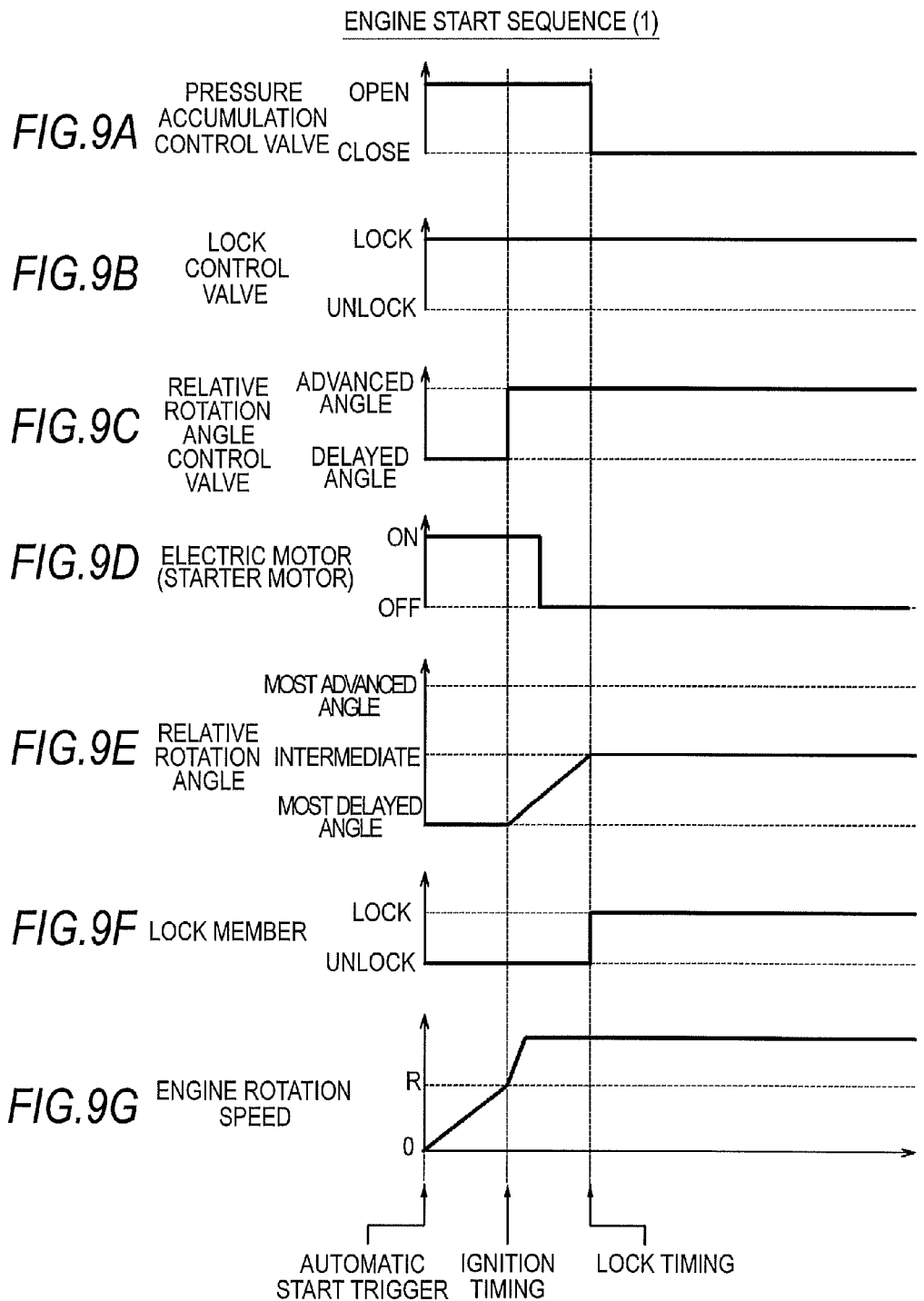

When the system is operated by the ON operation of the ignition switch 145, the stop condition is established in the operated state of the engine E, and the engine management device 140 acquires the automatic stopping trigger, in the state where the timing control portion 142 changes the relative rotation angle between external rotor 111 and the internal rotor 112 to the most delayed angle, the engine E is stopped (the engine stop sequence). Furthermore, when the start condition is established and the engine management device 140 acquires the automatic start-up trigger, if the engine temperature measured by the engine temperature sensor 147 exceeds a set value, the relative rotation angle is temporarily restricted to the most delayed angle during cranking due to driving of the electric motor M (the most delayed angle restriction control), and then, the control of changing the relative rotation angle in the advanced angle direction is performed. The timing chart of the control is illustrated in FIG. 9 (engine start sequence (101)).

When the ignition switch 145 is subjected to the ON operation by a driver and the engine management device 140 acquires the system starting trigger, the engine management device 140 acquires the engine temperature that is measured by the engine temperature sensor 147. In this manner, when the acquired engine temperature exceeds the set value, as in the engine start sequence (1) mentioned above, the relative rotation angle between the external rotor 111 and the internal rotor 112 is temporarily restricted to the most delayed angle during cranking, and then, the control of changing the relative rotation angle to the advanced angle direction. On the contrary, when the engine temperature measured by the engine temperature sensor 147 is less than the set value, the control of changing the relative rotation angle to the advanced angle direction at the same time as cranking is performed. The timing chart of the control is illustrated in FIG. 11 (engine start sequence (2)).

Although not illustrated as the timing chart, even when the engine E is automatically started after being automatically stopped, the engine temperature is measured by the engine temperature sensor 147, and even when the engine temperature is less than the set value, the engine start sequence (2) illustrated in FIG. 11 is executed.

Engine Start Sequence (1)

In the state where the relative rotation angle between the external rotor 111 and the internal rotor 112 is in the most delayed angle and the engine E is stopped by the engine stop sequence, when the engine management device 140 acquires the automatic start trigger, as illustrated in FIGS. 8 and 9, the timing control portion 142 sets the pressure accumulation control valve 126 to the opened position (a), the timing control portion 142 sets the relative rotation angle control valve 124 to the delayed angle position (c), the timing control portion 142 operates the lock control valve 125 to the locked position (b), and the engine control portion 141 drives the electric motor M to start cranking of the engine E (d).

The control is the most delayed angle restriction control, and the hydraulic fluid stored in the accumulator 127 in the pressurized state is sent to the connection oil path 131, the rotation angle control oil path 129, the relative rotation angle control valve 124, and the delayed angle control oil path 122 and is supplied to the delayed angle chamber Cb by executing the control. In order to perform cranking in the supply state, even in a situation where hydraulic fluid to be supplied from the hydraulic pump P is not supplied, pressure of hydraulic fluid from the delayed angle chamber Cb is caused to act on the vane 117, the relative rotation angle between the external rotor 111 and the internal rotor 112 is restricted to the most delayed angle, and thus disturbance of the relative rotation angle is prevented (e).

Next, at the timing when the rotation angle measured by the crank shaft sensor 146 reaches the required rotation speed R required for ignition by continuation of cranking, the relative rotation angle control valve 124 is set to the advanced angle position (c), and the using the ignition plug 105 is performed (g). When the engine E is operated by the control and the rotation speed of the crank shaft 101 further rises, cranking using the electric motor M is stopped (d).

In this manner, the control of changing (shifting) the relative rotation angle in the advanced angle direction is an advanced angle shifting control. The oil amount of hydraulic fluid supplied from the hydraulic pump P increases by the operation of the engine E. Hydraulic fluid from the hydraulic pump P and the hydraulic fluid from the accumulator 127 are supplied from the relative rotation angle control valve 124 to the advanced angle chamber Ca via the advanced angle control oil path 121, whereby the relative rotation angle between the external rotor 111 and the internal rotor 112 is changed (shifted) in the advanced angle direction, a pair of lock members 118 is concurrently engaged with the lock groove portion 112L, and the intermediate lock mechanism L enters the locked state (f).

Through the advanced angle shifting control, the relative rotation angle of the intake timing control mechanism 110 is locked to the lock angle using the intermediate lock mechanism L, and the engine E is stably operated.

Engine Start Sequence (2)

Figure 10:
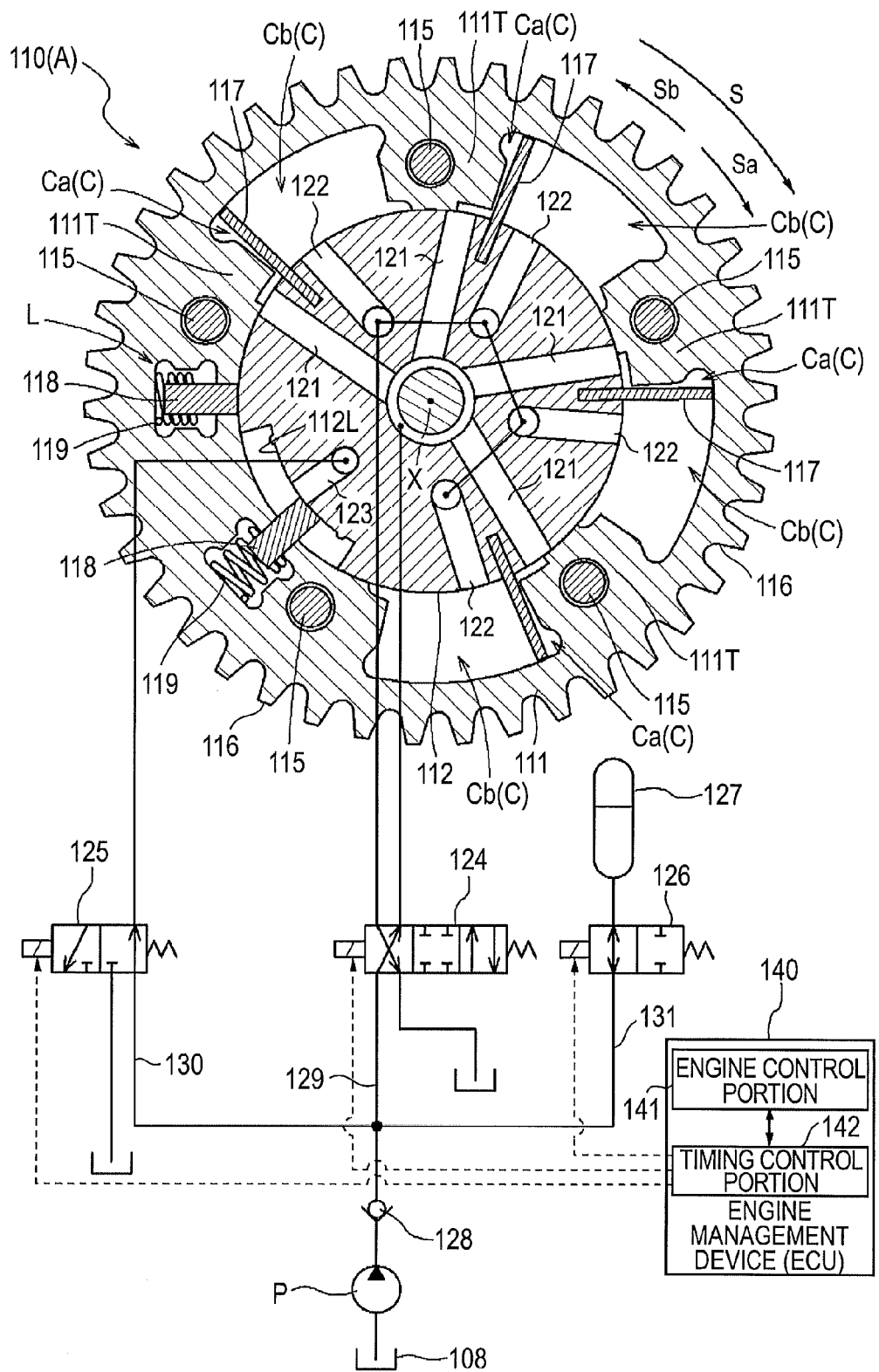
FIG. 10 is a diagram that illustrates a cross-section and a control configuration of the intake timing control mechanism at the beginning time of engine start sequence (2)

When the engine management device 140 acquires the system starting trigger, as illustrated in FIGS. 10 and 11, the timing control portion 142 sets the pressure accumulation control valve 126 to the opened position (a), the timing control portion 142 sets the relative rotation angle control valve 124 to the advanced angle position (c), the timing control portion 142 operates the lock control valve 125 to the locked position (b), and the engine control portion 141 drives the electric motor M to start cranking of the engine E (d).

By performing the control, hydraulic fluid stored in the accumulator 127 in the pressurized state is sent to the connection oil path 131, the rotation angle control oil path 129, the relative rotation angle control valve 124, and the advanced angle control oil path 121, and cranking is performed in the state of acting on the advanced angle chamber Ca. Thereby, even in a situation where hydraulic fluid from the hydraulic pump P is not supplied, the relative rotation angle between the external rotor 111 and the internal rotor 112 is continuously changed in the advanced angle direction, and the relative rotation angle of one in which the relative rotation angle slight fluctuates is changed in the advanced angle direction (e). When the relative rotation angle reaches the lock angle by the control, the pair of lock members 118 is concurrently engaged with the lock groove portion 112L, and the intermediate lock mechanism L reaches the locked state (f).

Next, by continuation of cranking, at the timing when the rotation speed measured by the crank shaft sensor 146 reaches the required rotation speed R required for ignition, the ignition is performed using the ignition plug 105 (g). Thereby, when the engine E is operated and the rotation speed of the crank shaft 101 further rises, cranking using the electric motor M is stopped (d).

By such control, the relative rotation angle of the intake timing control mechanism 110 is locked to the lock angle using the intermediate lock mechanism L, and the engine E is stably operated.

Although it is not illustrated in the timing chart, when a driver performs the OFF operation of the ignition switch 145 in a situation where the engine E is operated, if the intermediate lock mechanism L is in the unlocked state, the control is performed which changes the relative rotation angle, maintains the relative rotation angle at the lock angle using the intermediate lock mechanism L, and then controls stopping the engine E.

Operation and Effects of Embodiment

In this way, in the embodiment disclosed here, when automatically stopping the engine E, the relative rotation angle between the external rotor 111 and the internal rotor 112 is set to the most delayed angle and the engine E is stopped. Thereby, when the engine E is automatically started in a warm-up state where the engine temperature exceeds the set value, since the combustion chamber of the engine E is maintained at a low compression ratio, starting becomes easier, and the consumed electric power is also reduced. By the most delayed angle restriction control using the automatic start, hydraulic fluid stored in the accumulator 127 in the pressurized state is supplied to the delayed angle chamber Cb, and cranking is performed in the state where the relative rotation angle is restricted to the most delayed angle.

In the most delayed angle maintenance control, while the check valve 128 prevents hydraulic fluid of the accumulator 127 from flowing out in the direction of the hydraulic pump P in the state where most of hydraulic fluid from the hydraulic pump P is not supplied, hydraulic fluid is supplied to the delayed angle chamber Cb (the pressure acts), and the relative rotation angle is restricted to the most delayed angle. With such a restriction, the intake timing is not disturbed, and the vane 117 does not repeatedly come into contact with the protrusion portion 111T from the external rotor 111 so as not to generate abnormal sound. In particular, since the relative rotation angle is maintained at the most delayed angle by the supply of hydraulic fluid of the accumulator 127, the lock mechanism is not included, and the number of components of the device is not increased.

Next, by shifting the relative rotation angle in the advanced angle direction by the advanced angle shifting control to make the intermediate lock mechanism L the locked state, the engine E is operated at the stable state with good fuel efficiency.

Furthermore, when performing the automatic start-up, or when a driver performs the ON operation of the ignition switch 145, if the engine temperature exceeds the set value, by performing the same control as the most delayed angle restriction control, the intake timing is not disturbed in the state of maintaining the combustion engine at the low compression ratio, and thus starting which does not generate abnormal sound is realized. In this control, as mentioned above, the control of restricting the relative rotation angle to the most delayed angle using hydraulic fluid of the accumulator 127 while hydraulic fluid from the hydraulic pump P is not supplied.

On the contrary, when performing the automatic start, or when a driver performs the ON operation of the ignition switch 145, if the engine temperature is less than the set value, the relative rotation angle is changed in the advanced angle direction by hydraulic fluid of the accumulator 127 at the same time as cranking. Thereby, the relative rotation angle is rapidly changed up to the lock angle and is shifted to the locked state using the intermediate lock mechanism L, and thus the stable operation of the engine E is realized. Even in the control, the check valve 128 prevents hydraulic fluid of the accumulator 127 from flowing out in the direction of the hydraulic pump P while hydraulic fluid from the hydraulic pump P is not supplied, hydraulic fluid is supplied to the advanced angle chamber Ca (the pressure acts), the relative rotation angle is changed up to the lock angle, and locking using the intermediate lock mechanism L is realized.

Another Embodiment

The embodiment disclosed herein may be configured as below other than embodiment 2 mentioned above.

(a) When running is temporarily stopped such as waiting for a traffic light, the embodiment disclosed herein may be applied to the valve opening and closing apparatus of the engine E that stops the engine E, and that is to say, performs the idle stop control. When constructed in this way, when cranking is performed by the starter motor, it is possible to start the engine E without disturbing the intake timing and generating abnormal sound.

(b) When a driver stops the engine E by the operation of the ignition switch 145 in the state of the automatically stopped state of the engine E, in order to lock the relative rotation angle of the intake timing control mechanism 110 to the intermediate position using the intermediate lock mechanism L, the control form of the engine control portion 141 is set so as to reverse the electric motor M. With such a reverse rotation, the relative rotation angle can be reliably locked at the intermediate position.

(c) The valve opening and closing control apparatus disclosed herein is applied to a three-cylinder type engine E. In the three-cylinder type engine E, as elements that cause force in returning direction to the crank shaft to act, a compression stroke of a piston, an opening stroke of the cam shaft 103 of the intake side, and an opening stroke of the cam shaft of the exhaust side are generated at the same phase. Due to such a configuration, when stopping the engine E, the force of acting the crank shaft 101 in the returning direction acts in a direction causing the relative rotation angle between the external rotor 111 and the internal rotor 112 to face in the delayed angle direction, and thus, it is possible to restrict the relative rotation angle to the most delayed angle without causing the pressure of the hydraulic fluid from the accumulator 127 to act while the engine E is stopped. Otherwise, it is possible to favorably restrict the relative rotation angle to the most delayed angle even when the pressure of the hydraulic fluid from the accumulator 127 does not forcibly act when the engine E is started.

(d) When the intermediate lock mechanism L reaches the lock angle while preventing the rotation in an opposite direction (the delayed angle direction) when the relative rotation angle is changed in the advanced angle direction, a ratchet portion which maintains the rotation angle (the lock angle) is included. In the intermediate lock mechanism L, although there is a need for a configuration that releases the function of the latchet portion in the oil pressure manner, the phenomenon where the relative rotation angle fluctuates in the advanced angle direction is prevented even when the relative rotation angle fluctuates up to the intermediate position, and thus the smooth starting is realized.

Particularly, even when the intermediate lock mechanism L is formed by including the ratchet portion, when the state is shifted from the automatic stop state to the system stop state, the state can be shifted to the locked state using the intermediate lock mechanism L by rotating the crank shaft by driving of the electric motor M.

Third Embodiment

Overall Configuration

Figure 12:
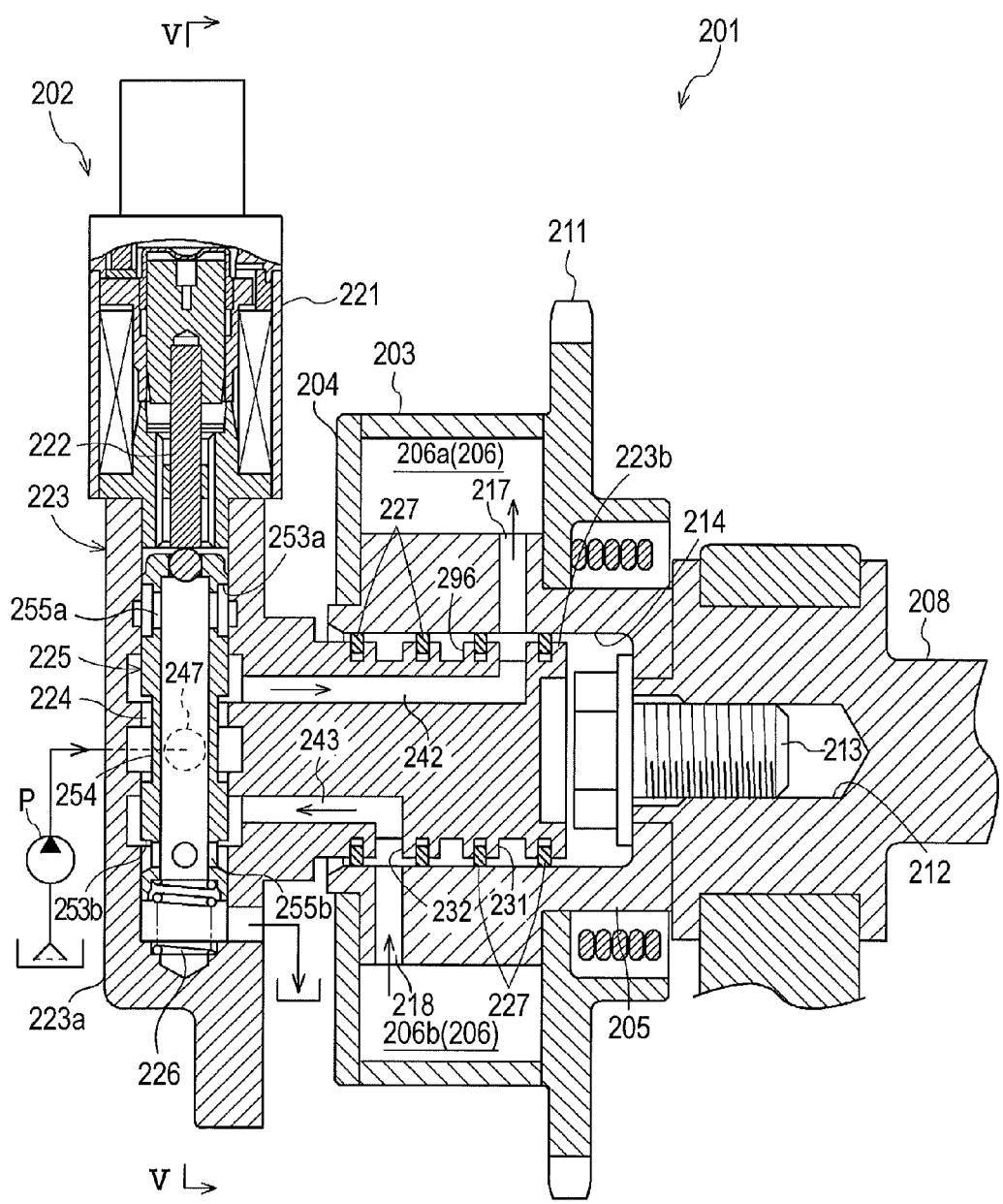
FIG. 12 is a cross-sectional view in a rotational axis direction of a valve opening and closing time control apparatus at a fluid control valve side.
Figure 13:
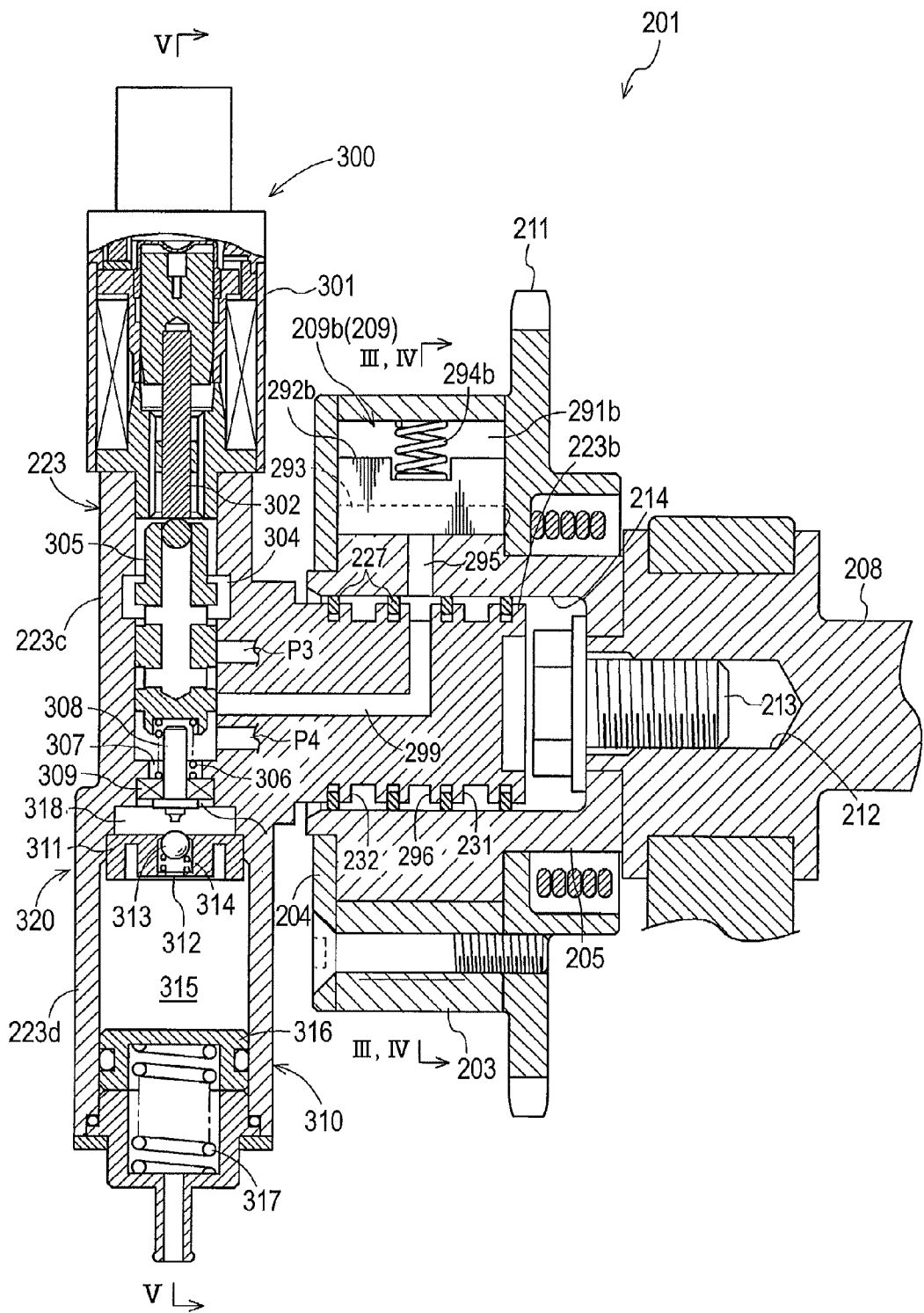
FIG. 13 is a cross-sectional view in a rotational axis direction of the valve opening and closing time control apparatus at a lock control valve side.

As illustrated in FIGS. 12 and 13, a valve opening and closing time control apparatus 201 includes an external rotor 203 and a front plate 204 as "driving side rotating members" that are rotated synchronously with a crank shaft (not illustrated) of an engine (an internal combustion engine), and an internal rotor 205 as a "driven side rotating member" that is placed on the same axis center with respect to the external rotor 203, and is rotated synchronously with a valve opening and closing the cam shaft 208 of the engine.

The internal rotor 205 is integrally assembled to a leading end portion of the cam shaft 208 that constitutes a rotation shaft of a cam (not illustrated) that controls opening and closing of an intake valve or an exhaust valve of the engine. A concave portion 214 is provided at an inner diameter side of the internal rotor 205, and a fixing hole 212 penetrating through the side of the cam shaft 208 is opened on the bottom surface thereof. A bolt 213 passes through the fixing hole 212, thereby the internal rotor 205 is fixed to the cam shaft 208. The camshaft 208 is assembled to a cylinder head (not illustrated) of the engine in a freely rotatable manner.

The external rotor 203 is integrated with the front plate 204 and is externally mounted with respect to the internal rotor 205 so as to be relatively rotatable within a predetermined range. A sprocket portion 211 is formed on the outer periphery of the external rotor 203. Between the sprocket portion 211 and a gear (not illustrated) attached to the crank shaft, a power transmission member (not illustrated) such as a timing chain and a timing belt is installed.

When the crank shaft is driven for rotation, the rotation movement power is transmitted to the sprocket portion 211 via the power transmission member, and the external rotor 203 is driven for rotation. Moreover, the internal rotor 205 is driven for rotation with the rotation driving of the external rotor 203, and thus the cam shaft 208 is rotated. Moreover, the cam that is provided in the camshaft 208 presses down the intake valve or the exhaust valve of the engine to open the valve.

Figure 14:
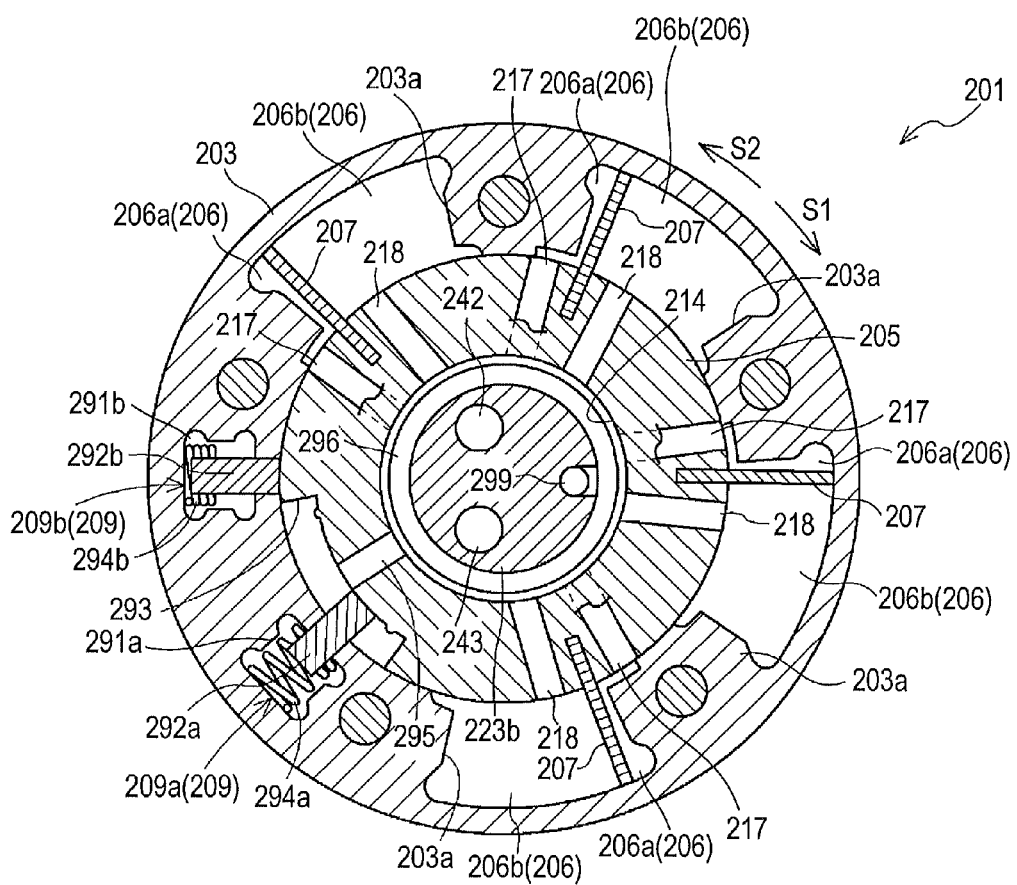
FIG. 14 is a cross-sectional view taken along line III-III in FIG. 13.

As illustrated in FIG. 14, the external rotor 203 is formed with a plurality of protrusion portions protruding in a diameter direction so as to be separated from each other along the rotation direction, and a fluid pressure chamber 206 is formed by the adjacent convex portions and the internal rotor 205. In the present embodiment, four fluid pressure chambers 206 are included.

Grooves are formed at locations facing the respective fluid pressure chambers 206 on the outer peripheral portion of the internal rotor 205, and vanes 207 as "partition portions" are inserted to the grooves. The fluid pressure chamber 206 is divided into an advanced angle chamber 206a and a delayed angle chamber 206b in the relative rotation direction (arrow S1 and S2 directions in FIGS. 14 and 15) by the vanes 207.

The internal rotor 205 is formed with an advanced angle chamber communication hole 217 and a delayed angle chamber communication hole 218. The advanced angle chamber communication hole 217 causes a cylindrical concave portion 214 to communicate with the advanced angle chamber 206a. The delayed angle chamber communication hole 218 causes the concave portion 214 to communicate with the delayed angle chamber 206b.

Figure 15:
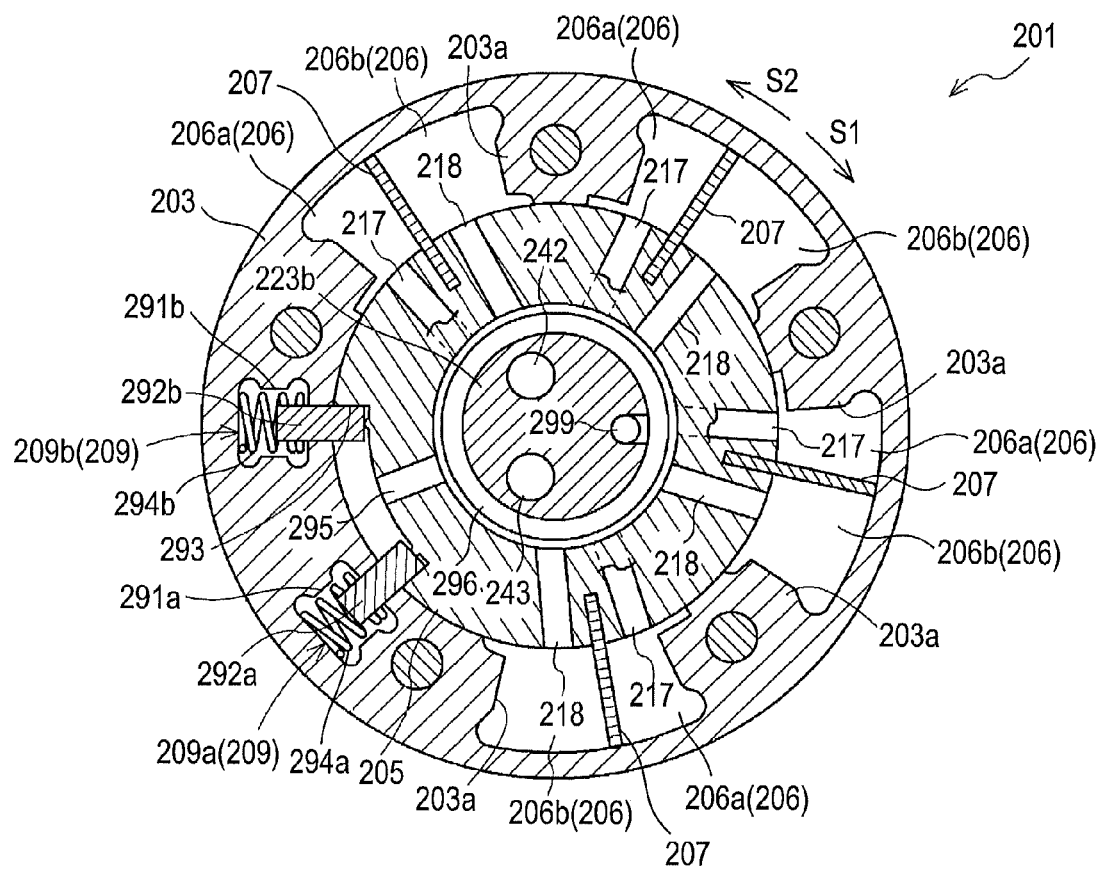
FIG. 15 is a cross-sectional view taken along line IV-IV in FIG. 13.

By supplying or discharging hydraulic fluid as "fluid" from the pump P to or from the advanced angle chamber 206a or the delayed angle chamber 206b, a relative rotation phase (hereinafter, referred to as a "relative rotation phase") between the internal rotor 205 and the external rotor 203 in the advanced angle direction S1 or the delayed angle direction S2. The advanced angle direction S1 refers to a direction in which the vane 207 indicated by an arrow S1 in FIGS. 14 and 15 is subjected to the relative displacement, and the delayed angle direction S2 refers to a direction in which the vane 207 indicated by an arrow S2 is subjected to the relative displacement.

When supplying hydraulic fluid to the advanced angle chamber 206a, the relative rotation phase is displaced in the advanced angle direction S1, and when supplying hydraulic fluid to the delayed angle chamber 206b, the relative rotation phase is displaced in the delayed angle direction S2. In addition, the displaceable range of the relative rotation phase is a range in which the vane 207 is displaced inside the fluid pressure chamber 206, and corresponds to a range between the most delayed angle phase of the maximum volume of the delayed angle chamber 206b and the most advanced angle phase of the maximum volume of the advanced angle chamber 206a.

Fluid Control Valve Mechanism

The fluid control valve mechanism includes a fluid control valve portion 202, and the supply or the discharge of hydraulic fluid to or from the advanced angle chamber 206a or the delayed angle chamber 206b is controlled by the fluid control valve portion 202. The fluid control valve mechanism is inserted to the concave portion 214 of the internal rotor 205 mentioned above in a relatively-rotatable manner, and is fixed to a static system such as a front cover of the engine. That is, the fluid control valve mechanism is still stopped, and does not follow the rotation of the internal rotor 205.

As illustrated in FIG. 12, the fluid control valve mechanism includes a solenoid 221, a housing 223, and a spool 225. The spool 225 has a cylindrical shape with a bottom. Furthermore, the housing 223 includes a first spool storing portion 223a that stores the spool 225, and a convex portion 223b that is inserted to the concave portion 214. The first spool storing portion 223a is formed with a hollow portion 224 that stores the spool 225. The hollow portion 224 has a cylindrical shape with a bottom that is opened to one side. Furthermore, the convex portion 223b has a cylindrical shape that corresponds to the shape of the concave portion 214. The hollow portion 224 of the first spool storing portion 223a and the convex portion 223b are formed so that the mutual extension direction proceeds straight. The spool 225 is stored in the hollow portion 224 so as to be linearly movable in a direction perpendicular to the rotation axis center direction of the cam shaft 208.

As illustrated in FIG. 12, the convex portion 223b is inserted to the concave portion 214 of the internal rotor 205 in a relatively rotatable manner, and the housing 223 is fixed to the front cover or the like of the engine. Thereby, the internal rotor 205 is supported by the convex portion 223b by a relatively rotatable manner.

A spring 226 is installed between the spool 225 and the bottom surface of the hollow portion 224. For this reason, the spool 225 is biased to the opening side of the hollow portion 224. The solenoid 221 is installed at the end portion of the opening side of the first spool storing portion 223a to cause the spool 225 to reciprocate in a direction perpendicular to the rotation axis center direction of the cam shaft 208. A rod 222 of the leading end portion of the solenoid 221 comes into contact with the bottom portion of the spool 225. When conducting electricity to the solenoid 221, the rod 222 is extended from the solenoid 221 and presses the bottom portion of the spool 225, and thus the spool 225 is moved downward in FIG. 12. When stopping the electric conduction, the rod 222 retreats to the side of the solenoid 221. The spool 225 follows the movement of the rod 222 and is moved to the side of the solenoid 221 by the biasing force of the spring 226 mentioned above. The solenoid 221, the rod 222, the spool 225, and the spring 226 constitute the fluid control valve portion 202.

On the outer peripheral surface of the convex portion 223b, three annular grooves are formed in parallel over the outer periphery thereof. A hydraulic fluid anti-leak sealing ring 227 is installed in each of the grooves. Between the respective adjacent grooves, similarly, an advanced angle outer peripheral groove 231 and a delayed angle outer peripheral groove 232 that are annular grooves are formed. A leak of hydraulic fluid from the advanced angle outer peripheral groove 231 and the delayed angle outer peripheral groove 232 is prevented by the sealing ring 227. As illustrated in FIG. 12, the advanced angle outer peripheral groove 231 always communicates with the advanced angle chamber communication hole 217. Furthermore, the delayed angle outer peripheral groove 232 always communicate with the delayed angle chamber communication hole 218.

Figure 16:
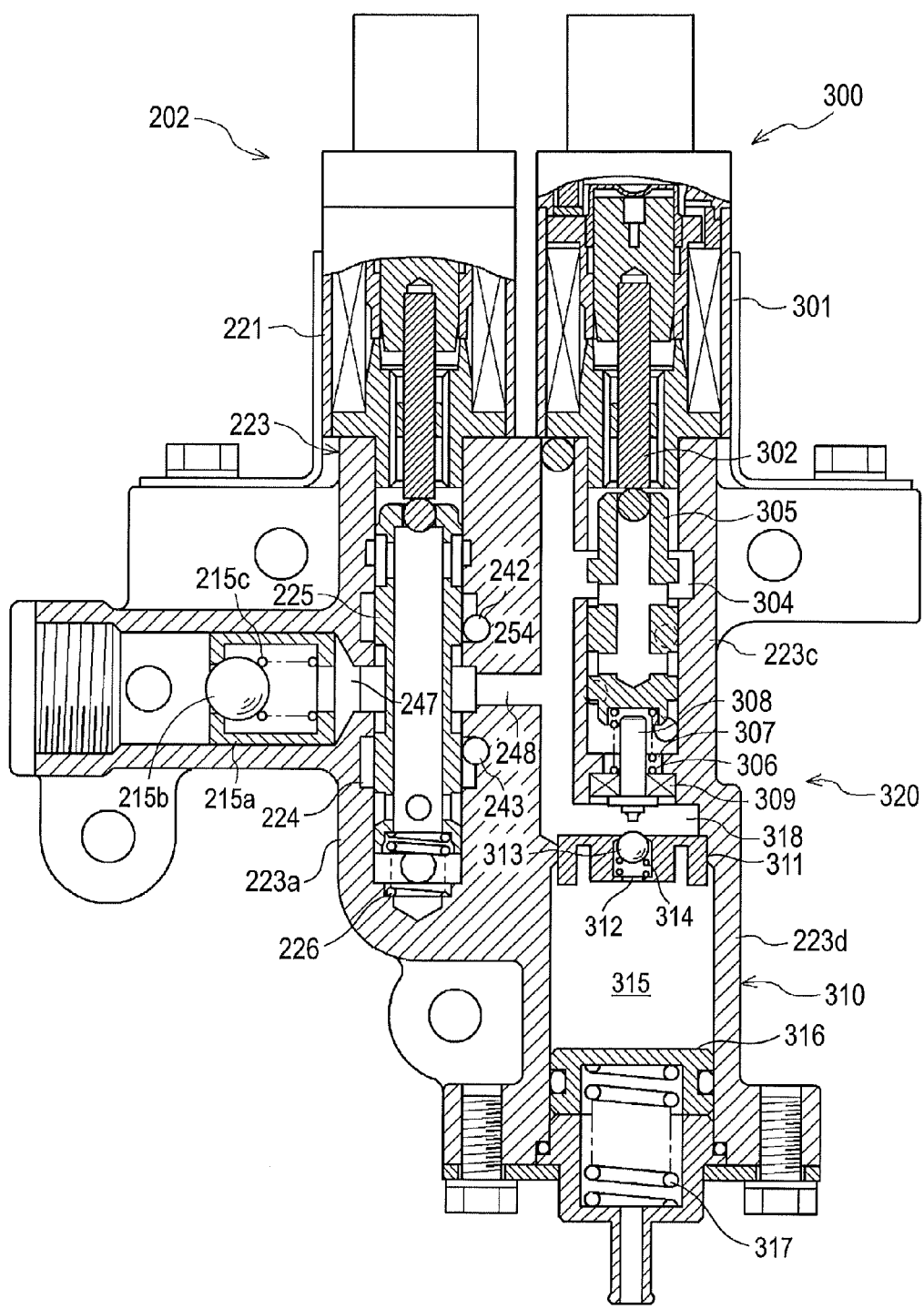
FIG. 16 is a cross-sectional view taken along line V-V in FIGS. 12 and 13.

Furthermore, as illustrated in FIGS. 12 and 16, a supply side flow path 247 is formed in a direction that is perpendicular to the first spool storing portion 223a, and an advanced angle side flow path 242 and a delayed angle side flow path 243 are formed inside the convex portion 223b along the extension direction of the convex portion 223b, that is, the extension direction of the cam shaft 208. One end of the supply side flow path 247 communicates with the hollow portion 224 of the first spool storing portion 223a, and the other end thereof is supplied with hydraulic fluid from the pump P. A sleeve 215 is provided in the middle portion of the supply side flow path 247, and a spherical valve body 215b is provided in a space of the sleeve 215. A spring 215c is interposed between the spherical valve body 215b and the downstream side of the supply side flow path 247 of the sleeve 215a, and is biased toward the upstream side of the supply side flow path 247 of the sleeve 215a. Thereby, a reverse flow of hydraulic fluid in the supply side flow path 247 is prevented. One end of the advanced angle side flow paths 242 is opened to the hollow portion 224, and the other end thereof is opened to the advanced angle outer peripheral groove 231. The advanced angle side flow path 242 forms a part of the advanced angle outer peripheral groove 231. Furthermore, one end of the delayed angle side flow path 243 is opened to the hollow portion 224, and the other end thereof is opened to the delayed angle outer peripheral groove 232. The delayed angle side flow path 243 forms a part of the delayed angle outer peripheral groove 232.

As illustrated in FIGS. 12 and 16, on the outer peripheral surface of the spool 225, annular discharging outer peripheral grooves 253a and 253b and a supplying outer peripheral groove 254 are formed over the entire outer periphery. In the discharging outer peripheral grooves 253a and 253b are each provided with through holes 255a and 255b that penetrate through the internal hollow portion.

A position relationship between the discharging outer peripheral grooves 253a and 253b and the supplying outer peripheral groove 254 is as below. When electricity is not conducted to the solenoid 221, as illustrated in FIG. 12, the supplying outer peripheral groove 254 is set so as to cause the supply side flow path 247 and the advanced angle side flow path 242 to communicate with each other, and the discharging outer peripheral groove 253a is set so as to communicate with the delayed angle side flow path 243. When electricity is conducted to the solenoid 221, the supplying outer peripheral groove 254 is set so as to cause the supply side flow path 247 and the delayed angle side flow path 243 to communicate with each other, and the discharging outer peripheral groove 253b is set so as to communicate with the advanced angle side flow path 242.

Intermediate Lock Mechanism

Between the external rotor 203 and the internal rotor 205, there is provided an intermediate lock mechanism 209 having an intermediate lock flow path 299 that is switched into a locked state of locking the relative rotation between the external rotor 203 and the internal rotor 205 at an intermediate position between the most delayed angle position and the most advanced angle position, and an unlocked state of unlocking the locked state. A configuration is provided so that the displacement of the relative rotation phase is locked in an intermediate lock phase (see FIG. 15) between the most advanced angle phase and the most delayed angle phase using the intermediate lock mechanism 209.

As illustrated in FIGS. 14 and 15, the intermediate lock mechanism 209 includes locking storing portions 291a and 291b, exiting members 292a and 292b, a locking concave portion 293, and springs 294a and 294b. The locking storing portions 291a and 291b are formed in the external rotor 203, and the locking concave portion 293 is formed in the internal rotor 205. The exiting members 292a and 292b can be displaced between a locked state of thrusting into the locking concave portion 293 to lock the relative rotation and an unlocked state of retreating from the locking concave portions 293 to the locking storing portions 291a and 291b to unlock the locked state. The exiting members 292a and 292b are always biased so as to break into the locking concave portion 293 by the springs 294a and 284b provided in the locking storing portions 291a and 291b.

Lock Control Valve Portion

As illustrated in FIGS. 13 and 16, the housing 223 is also provided with a lock control valve portion 300 that performs the control of the supply or the discharge of fluid to the fluid control valve portion 202 and the intermediate lock flow path 299 of the intermediate lock mechanism 209. The lock control valve portion 300 includes a solenoid 301, a housing 223, and a spool 305, and the spool 305 has a cylindrical shape with a bottom. Furthermore, the housing 223 includes a second spool storing portion 223c that stores the spool 305, and an accumulator storing portion 223d that stores an accumulator 310 mentioned later. The second spool storing portion 223c is formed with a hollow portion 304 that stores the spool 305. The hollow portion 304 has a cylindrical shape. The spool 305 is stored in the hollow portion 304 so as to be linearly movable in a direction that is perpendicular to the rotation axis center direction of the cam shaft 208.

A communication portion 307 to the accumulator 310 is formed near the bottom portion of the hollow portion 304, and a pressing member 308 that opens and operates the accumulator 310 is placed in the communication portion 307. A bearing member 309 is provided on the outer periphery of the pressing member 308, and the spring 306 is provided between the spool 305 and the bearing member 309. The spool 305 is biased to the solenoid 301 side of the hollow portion 304 by the spring 306. The pressing member 308 is maintained by the spring 306, and in a state where electricity is not conducted to the solenoid 301, the pressing member 308 is maintained at a position that is separated from the leading end portion of the spool 305.

The solenoid 301 is provided in the end portion of the opening side of the second spool storing portion 223c, thereby to cause the spool 225 to reciprocate in a direction that is perpendicular to the rotation axis center direction of the cam shaft 208. The rod 302 of the leading end portion of the solenoid 301 comes into contact with the bottom portion of the spool 305. When conducting electricity to the solenoid 301, the rod 302 is extended from the solenoid 301 and presses the bottom portion of the spool 305, and thus the spool 305 is moved downward in FIG. 13. When stopping the electric conduction to the solenoid 301, the rod 302 retreats to the side of the solenoid 301. The spool 305 follows the movement of the rod 302 and is moved to the side of the solenoid 301 by the biasing force of the spring 306 mentioned above. The solenoid 301, the rod 302, the spool 305, and the spring 306 constitute the lock control valve portion 300.

As illustrated in FIGS. 12, 13 and 16, the housing 223 includes a second spool storing portion 223c that stores the spool 305 of the lock control valve portion 300, and an accumulator storing portion 223d that stores the accumulator 310, in addition to the first spool storing portion 223a that stores the spool 225, and the convex portion 223b that is inserted to the concave portion 214. The second spool storing portion 223c is provided together with the first spool storing portion 223a in a direction perpendicular to the extension direction of the convex portion 223b, that is, in a direction perpendicular to the extension direction of the camshaft 208. As illustrated in FIG. 16, in the extension direction of the convex portion 223b, that is, in the extension direction of the cam shaft 208, the first spool storing portion 223a and the second spool storing portion 223c are provided so as to be located on substantially the same plane.

On the outer peripheral surface of the convex portion 223b of the housing 223, as illustrated in FIG. 13, four annular grooves are formed in parallel over the entire outer periphery thereof. A hydraulic fluid anti-leak sealing ring 227 is installed in each of the grooves. Between the respective adjacent grooves, a locking outer peripheral groove 296 is formed, in addition to the advanced angle outer peripheral groove 231 and the delayed angle outer peripheral groove 232. The locking outer peripheral groove 296 always communicates with the lock communication hole 295 that is connected to the locking concave portion 293.

Furthermore, as illustrated in FIG. 13, an intermediate lock flow path 299 is formed along the extension direction of the convex portion 223b. One end of the intermediate lock flow path 299 is opened to the hollow portion 304, and the other end thereof always communicates with the locking outer peripheral groove 296. The intermediate lock flow path 299 forms a part of the locking outer peripheral groove 296. Furthermore, as illustrated in FIG. 16, a connection oil path 248 is formed between the supply side flow path 247 and the hollow portion 304.

Accumulator

As illustrated in FIGS. 13 and 16, the accumulator 310 is placed via the accumulator control valve portion 320 provided on the extension in the reciprocating movement direction of the spool 305 of the lock control valve portion 300. The accumulator 310 is a container that stores fluid (hydraulic fluid) that is supplied to the fluid control valve portion 202 when starting the engine in the pressurized state. The solenoid 301 controls the lock control valve portion 300, and also controls the accumulator control valve portion 320. That is, the valve opening and closing time control apparatus shares the solenoid 301 that controls the lock control valve portion 300, and the solenoid 301 that controls the accumulator control valve portion 320. Specifically, the accumulator control valve portion 320 is configured so that the partition wall portion 311 of the accumulator 310 is provided in the hollow portion 304, and the accumulator control valve portion 320 is configured to include a spherical valve body 313 and a spring 314 in the through hole 312 of the partition wall portion 311. The spherical valve body 313 is located on the extension in the reciprocating movement direction of the spool 305. The spring 314 biases the spherical valve body 313 in the closing direction. Thereby, the reverse flow of hydraulic fluid in the accumulator 310 is prevented. The accumulator 310 includes a movable wall portion 316 that is moved onto the extension in the reciprocating movement direction of the spool 305 and varies the volume of the fluid storage portion 315, at a side opposite to the accumulator control valve portion 320. Furthermore, the movable wall portion 316 is provided with a spring 317 that biases the movable wall portion 316 so as to press hydraulic fluid in the fluid storage portion 315.

Operation of Lock Control Valve Portion

The operation of the lock control valve portion 300 will be described based on FIGS. 17A, 17B and 17C.

The lock control valve portion 300 is configured so that the position of the spool 305 can be switched between an intermediate lock position (FIG. 17A) where fluid is discharged from the intermediate lock flow path 299 to obtain a locked state, a duty position (FIG. 17B) where fluid is supplied to the intermediate lock flow path 299 to obtain an unlocked state, and an accumulator operating position (FIG. 17C) where the accumulator 310 is subjected to the opening operation.

FIG. 17A illustrates the position (the intermediate lock position) of the spool 305 of the lock control valve portion 300 when the engine is stopped. Herein, electricity is not conducted to the solenoid 301, and the position of the spool 305 is located at the most approaching side of the solenoid 301. Although hydraulic fluid that is supplied from the supply side flow path 247 via the connection oil path 248 flows in the spool 305 from an inflow port P1 formed in the spool 305, the communication of an outflow port P2 separately formed in the spool 305 with the intermediate lock flow path 299 is blocked. Meanwhile, the intermediate lock flow path 299 communicates with the drain hole P4, and thus hydraulic fluid is discharged to the drain hole P4. In this way, a locked state is obtained where the relative rotation of the driven side rotating member relative to the driving side rotating member is locked to the intermediate position between the most delayed angle position and the most advanced angle position. That is, the position of the spool 305 of this state is the intermediate lock position. Furthermore, since the supply side flow path 247 communicates with an injection flow path 318 that injects hydraulic fluid to the accumulator 310 via the connection oil path 248, the accumulator 310 is in a state where hydraulic fluid can be injected.

FIG. 17B illustrates the position (the duty position) of the spool 305 of the lock control valve portion 300 when the engine is normally operated. Herein, the electric conduction to the solenoid 301 is an intermediate state, and the position of the spool 305 is located at the side of the accumulator 310 further than the position of FIG. 17A. The outflow port P2 and the intermediate lock flow path 299 enter the communicated state, and the hydraulic fluid which flows in the inflow port P1 from the supply side flow path 247 via the connection oil path 248 is supplied to the intermediate lock flow path 299 from the outflow port P2. Meanwhile, the communication between the intermediate lock flow path 299 and the drain holes P3 and P4 is blocked. In this way, the unlocked state is obtained where the locked state of the relative rotation of the driven side rotating member relative to the driving side rotating member is released. Furthermore, since the supply side flow path 247 communicates with the injection flow path 318 that injects hydraulic fluid to the accumulator 310, the accumulator 310 is in a state where hydraulic fluid can be injected.

FIG. 17C illustrates the position (the operation position of the accumulator) of the spool 305 of the lock control valve portion 300 when the engine is started. Herein, there is a state where the electric conduction to the solenoid 301 is nearly the maximum, and the position of the spool 305 is located at the accumulator 310 side further than the position of FIG. 17B. The pressing member 308 located at the leading end portion of the spool 305 pushes the spherical valve body 313 of the check valve and the accumulator control valve portion 320 is opened and operated. That is, the position of the spool 305 becomes the accumulator operation position. At this time, since the engine is started, hydraulic fluid is no longer supplied to the inflow port P1 and the injection flow path 318 to the accumulator 310 via the connection flow path 248 from the supply side flow path 247. Thus, when the accumulator control valve portion 320 is opened, hydraulic fluid in the accumulator 310 is discharged mainly toward the injection flow path 318. Hydraulic fluid discharged from the accumulator 310 is supplied to the fluid control valve portion 202 via the injection flow path 318.

After that, by switching the position of the spool 305 of the lock control valve portion 300 to the duty position, even when the engine is started, it is possible to reliably perform the control of the advanced angle and the delayed angle by the fluid control valve portion 202 using hydraulic fluid stored in the accumulator 310.

When the position of the spool 305 of the lock control valve portion 300 is switched to the accumulator operating position, the intermediate lock flow path 299 is switched into the drain state so as to enter the locked state. That is, when the spool 305 of the lock control valve portion 300 is at the accumulator operating position, the intermediate lock flow path 299 communicates with the drain hole P3, and thus hydraulic fluid is discharged to the drain hole P3. In this way, when the position of the spool 305 of the lock control valve portion 300 is switched to the accumulator operating position, fluid is discharged from the intermediate lock flow path 299, and the exiting members 292a and 292b of the intermediate lock mechanism easily enter the locking concave portion 293. Meanwhile, by the configuration that hydraulic fluid from the accumulator 310 is supplied to the advanced angle chamber 206a, the intermediate lock mechanism can be reliably operated when starting the engine, and thus startability of the engine increases.

Furthermore, as mentioned above, the position of the spool 305 of the lock control valve portion 300 is at the intermediate lock position or the duty position, the spherical valve body 313 capable of injecting hydraulic fluid to the accumulator 310 is included in the accumulator control valve portion 320, and the pressing member 308 capable of opening and operating the spherical valve body 313 at the accumulator operating position is provided at one end of the spool 305.

In order to supply hydraulic fluid to the fluid control valve portion 202 from the accumulator 310 when starting the engine, it is necessary that hydraulic fluid be injected to the accumulator 310 by that time. As in the present embodiment, in the state of not discharging and using hydraulic fluid of the accumulator 310, if the configuration is provided in which hydraulic fluid is injected to the accumulator 310 by the spherical valve body 313 provided in the accumulator control valve portion 320, there is no need to separately inject hydraulic fluid to the accumulator 310. As a result, injection operation of hydraulic fluid to the accumulator 310 in the valve opening and closing time control apparatus 201 is simplified.

Furthermore, if the pressing member 308 capable of opening and operating the spherical valve body 313 at the accumulator operating position is provided at one end of the spool 305 of the lock control valve portion 300, the pressing member 308 is able to open the spherical valve body 313 and open the accumulator control valve portion 320 when the spool 305 of the lock control valve portion 300 is at the accumulator operating position. As a result, it is possible to reliably perform the fluid supply from the accumulator 310 to the fluid pressure chamber 206 when starting the engine.

Operation of Valve Opening and Closing Time Control Apparatus

The operation of the valve opening and closing time control apparatus 201 will be described based on the drawings.

As illustrated in FIG. 12, when supplying hydraulic fluid to the advanced angle chamber 206a and displacing the relative rotation phase in the advanced angle direction S1, the non-conduction state is provided where electricity is not conducted to the solenoid 221 of the fluid control valve portion 202. At this time, due to the biasing force of the spring 226, the spool 225 is moved to the side of the solenoid 221 together with the rod 222 of the solenoid 221. In the non-conduction state, when supplying hydraulic fluid from the plump P to the supply side flow path 247, as illustrated in FIGS. 12 and 14, hydraulic fluid is pumped to the respective advanced angle chambers 206a from the supply side flow path 247 via the supplying outer peripheral groove 254, the advanced angle side flow path 242, the advanced angle outer peripheral groove 231, and the advanced angle chamber communication hole 217. At this time, the vane 207 is relatively moved in the advanced angle direction S1, and the hydraulic fluid of each delayed angle chamber 206b is discharged. The hydraulic fluid is discharged from the respective delayed angle chambers 206b to the outside via the respective delayed angle chamber communication holes 218, the delayed angle outer peripheral groove 232, the delayed angle side flow path 243, the discharging outer peripheral groove 253a, the through hole 255a and a drain flow path (not illustrated).

Meanwhile, when supplying hydraulic fluid to the delayed angle chamber 206b and displacing the relative rotation phase in the delayed angle direction S2, the electric conduction of the fluid control valve portion 202 to the solenoid 221 is performed. At this time, the spool 225 is pushed to the rod 222 of the solenoid 221 and enters the state of being moved downward. In the electric conduction state, when supplying hydraulic fluid from the pump P to the supply side flow path 247, hydraulic fluid is pumped from the pump P to the delayed angle chamber 206b via the supply side flow path 247, the supplying outer peripheral groove 254, the delayed angle side flow path 243, the delayed angle outer peripheral groove 232, and the delayed angle chamber communication hole 218. At this time, the vane 207 is relatively moved in the delayed angle direction S2, and the hydraulic fluid of each advanced angle chamber 206a is discharged. The hydraulic fluid is discharged from each advanced angle chamber 206a to the outside via each advanced angle chamber communication hole 217, the advanced angle outer peripheral groove 231, the advanced angle side flow path 242, the discharging outer peripheral groove 253b, the communication hole 255b and a drain flow path (not illustrated).

As mentioned above, since the fluid control valve portion 202, the lock control valve portion 300, and the accumulator control valve portion 320 are included at a side opposite to the cam shaft 208 with the driving side rotating member (the external rotor 203) or the driven side rotating member (the internal rotor 205) interposed therebetween, it is possible to reliably supply hydraulic fluid from the accumulator 310 to the fluid control valve portion 202 when starting the internal combustion engine. Thereby, it is possible to obtain valve opening and closing characteristics using the fluid control valve portion 202 from immediately after starting the engine. Furthermore, since the solenoid 301 that controls the lock control valve portion 300 is shared with the solenoid 301 that controls the accumulator control valve portion 320, it is possible to form the valve opening and closing time control apparatus 201 itself in a compact manner.

Furthermore, by the reciprocating movement of the spool 305 provided in the lock control valve portion 300, the position of the spool 305 can be switched between the locked state where hydraulic fluid is discharged from the intermediate lock flow path 299 and the unlocked state where hydraulic fluid is supplied to the intermediate lock flow path 299, and thus the accumulator control valve portion 320 can be opened and operated. That is, the spool 305 of the lock control valve portion 300 can be used for the control of the lock control valve portion 300 and the accumulator control valve portion 320, and thus, there is no need for a separate member for controlling the accumulator control valve portion 320. Thereby, the operation mechanism of the lock control valve portion 300 and the accumulator control valve portion 320 is simplified, and the operation of the lock control valve portion 300 and the accumulator control valve portion 320 is also simply and easily performed.

Another Embodiment (1) In Embodiment 3 mentioned above, although two exiting members 292a and 292b are configured so as to enter one locking concave portion 293 to form the locked state, the embodiment is not limited thereto. Although it is not illustrated, for example, a configuration may be adopted in which only one exiting member is included in one locking concave portion 293. In this case, the width of the locking concave portion 293 is set to substantially the same extent as that of the exiting member in the circumferential direction.

(2) In Embodiment 3 mentioned above, although the accumulator control valve portion 320 is configured so as to be opened and operated using the spool 305 of the lock control valve portion 300, the operation member of the accumulator control valve portion 320 may be formed by a member different from the spool 305 of the lock control valve portion 300.

(3) In Embodiment 3 mentioned above, an example is illustrated in which the accumulator 310 (the fluid storage portion 315) is placed on the extension in the reciprocating movement direction of the spool 305 of the lock control valve portion 300, but the accumulator 310 may be placed at a position other than on the extension in the reciprocating movement direction of the spool 305 of the lock control valve portion 300.

The embodiment disclosed herein can be used in a valve opening and closing control apparatus that controls the opening and closing timing of the intake valve, in an internal combustion engine that is automatically stopped when the stop condition is established in a situation where the stop operation is not performed by a driver, and is automatically started when the start condition is next established.

The embodiment disclosed herein may be used in a valve opening and closing time control apparatus of a vehicle and the internal combustion engine.

What is claimed is:

1. A valve opening and closing time control apparatus that is equipped in an internal combustion engine which is automatically stopped by an engine control portion, when a stop condition is established in a situation that a stop operation is not performed by a driver, and is automatically started by the engine control portion when a start condition is next established, the apparatus comprising:

a driving side rotating body that is rotated synchronously with a crank shaft of the internal combustion engine;

a driven side rotating body configured to rotate integrally with a cam shaft of the internal combustion engine and to rotate relative to the driving side rotating body;

an advanced angle chamber that changes a relative rotation angle between the driving side rotating body and the driven side rotating body in an advanced angle direction by supply of hydraulic fluid, and a delayed angle chamber that changes the relative rotation angle in a delayed angle direction by supply of hydraulic fluid, the advanced angle chamber and the delayed angle chamber being formed between the driving side rotating body and the driven side rotating body;

a relative rotation angle control unit that sets the relative rotation angle in a control region between the most advanced angle and the most delayed angle;

wherein the relative rotation angle control unit performs most delayed angle setting control of setting the relative rotation angle between the driving side rotating body and the driven side rotating body to the most delayed angle when performing the automatic stop, and most delayed angle restriction control of maintaining the relative rotation angle in the most delayed angle from the beginning of the automatic start until reaching a set timing when the automatic start-up begins, and releasing the maintenance of the most delayed angle after the setting timing;

wherein the relative rotation angel control unit includes a relative rotation angle control valve that selects one the of the advanced angle chamber and the delayed angle chamber and supplies the hydraulic fluid, an accumulator that stores the hydraulic fluid in a pressurized state, and a pressure accumulation control valve that controls the accumulator;

the relative rotation angle control unit executes the most delayed angle setting control of setting the relative rotation angle to the most delayed angle when performing the automatic stop, controls the relative rotation angle control valve at a delayed angle position from the beginning of the automatic start to the set timing when the automatic start-up beings, and controls the pressure accumulation valve so as to cause the pressure of the hydraulic fluid of the accumulator to act on the delayed angle chamber; and wherein a control path is formed which supplies the hydraulic fluid from the hydraulic pump that is driven by the internal combustion engine to the delayed angle chamber, a check valve, which allows the flow of hydraulic fluid sent from the hydraulic pump at the hydraulic pump side position further than the relative rotation angle control valve, is interposed with respect to the control oil path, and the hydraulic fluid from the accumulator is supplied to the control oil path between the relative rotation angle control vale and the check valve by a connection oil path.

2. The valve opening and closing time control apparatus according to claim 1, further comprising:

a most delayed angle lock mechanism that restricts the relative rotation angle to the most delayed angle, wherein the relative rotation angle control unit performs the most delayed angle setting control of making the most delayed angle lock mechanism a locked state be set to the most delayed angle when performing the automatic stop, and executes the most delayed angle restriction control of maintaining the most delayed angle lock mechanism in the locked state from the beginning of the automatic start until reaching the set timing when the automatic start-up begins and performing unlock of the most delayed angle lock mechanism after the set timing.

3. The valve opening and closing time control apparatus according to claim 2, wherein the relative rotation angle control unit includes a relative rotation angle control valve that selects one of the advanced angle chamber and the delayed angle chamber and supplies the hydraulic fluid, a timing control portion that controls the relative rotation angle control valve, an accumulator that stores the hydraulic fluid in the pressurized state, and a pressure accumulation control valve that controls the accumulator, and the engine control portion performs the ignition of the internal combustion engine when reaching the set timing from the beginning of the automatic start, and the timing control portion unlocks the most delayed angle lock mechanism by the pressure of the hydraulic fluid of the accumulator when reaching the set timing and supplies the hydraulic fluid from the hydraulic pump that is driven by the internal combustion engine to the advanced angle chamber, by controlling the relative rotation angle control valve.

4. The valve opening and closing time control apparatus according to claim 3, further comprising:

a lock control oil path that causes the hydraulic fluid from the hydraulic pump to act in a direction of unlocking the most delayed angle lock mechanism, wherein a lock control valve, and a check valve which allows the flow of hydraulic fluid sent from the hydraulic pump at a hydraulic pump side position further than the lock control valve are interposed with respect to the lock control oil path, and the hydraulic fluid from the accumulator is supplied to the lock control oil path between the lock control valve and the check valve by a connection oil path.

5. The valve opening and closing time control apparatus according to claim 1, wherein a check valve is included between the hydraulic pump that is driven by the internal combustion engine and the relative rotation angle control valve, and the relative rotation angle control unit controls the relative rotation angle control valve at the delayed angle position from the automatic stop to the automatic start.

6. The valve opening and closing time control apparatus according to claim 1, further comprising:

an intermediate lock mechanism that restricts the relative rotation angle to a lock angle between the most advanced angle and the most delayed angle.

7. The valve opening and closing time control apparatus according to claim 6, further comprising:

an electric motor that rotates and drives the crank shaft of the internal combustion engine, wherein when a driver performs an operation that stops the internal combustion engine in the state where the internal combustion engine is automatically stopped, the engine control portion reverses the electric motor so as to be set to the lock angle.

8. The valve opening and closing time control apparatus according to claim 1, wherein the apparatus is configured in a three-cylinder type in which a compression stroke of a piston to the crank shaft, an opening process of the cam shaft of the intake side, and an opening process of the cam shaft of the exhaust side act in the delayed angle direction in a coordinate phase in the state of the internal combustion engine being stopped.

9. A valve opening and closing time control apparatus that is equipped in an internal combustion engine which is automatically stopped by an engine control portion, when a stop condition is established in a situation that a stop operation is not performed by a driver, and is automatically started by the engine control portion when a start condition is next established, the apparatus comprising:
  a driving side rotating body that is rotated synchronously with a crank shaft of the internal combustion engine;
  a driven side rotating body adapted to rotate integrally with a cam shaft of the internal combustion engine and adapted to relatively rotate with the driving side rotating body;
  an advanced angle chamber that changes a relative rotation angle between the driving side rotating body and the driven side rotating body in an advanced angle direction by supply of hydraulic fluid, and a delayed angle chamber that changes the relative rotation angle in a delayed angle direction by supply of hydraulic fluid, the advanced angle chamber and the delayed angle chamber being formed between the driving side rotating body and the driven side rotating body;
  a relative rotation angle control unit that sets the relative rotation angle in a control region between the most advanced angle and the most delayed angle;
  wherein the relative rotation angle control unit performs most delayed angle setting control of setting the relative rotation angle between the driving side rotating body and the driven side rotating body to the most delayed angle when performing the automatic stop, and most delayed angle restriction control of maintaining the relative rotation angle in the most delayed angle from the beginning of the automatic start until reaching a set timing when the automatic start-up begins, and releasing the maintenance of the most delayed angle after the setting timing;
  wherein the relative rotation angle control unit includes an intermediate lock mechanism that restricts the relative rotation angle at an intermediate position between the most advanced angle and the most delayed angle, a lock control valve that performs the control of supply or discharge of the hydraulic fluid relative to the intermediate lock mechanism, a relative rotation angle control vale that selects one of the advanced angle chamber and the delayed angle chamber and supplies the hydraulic fluid, an accumulator that stores the hydraulic fluid in the pressurized state, and a pressure accumulation control valve that controls the accumulator;
  at a side opposite to the cam shaft with the driving side rotating body or the driven side rotating body interposed therebetween, the relative rotation control valve, the lock control valve, and the pressure accumulation control valve are included, and a solenoid that controls the relative rotation control valve and a solenoid that controls the pressure accumulation control valve are shared; and
  wherein a control oil path is formed which supplies the hydraulic fluid from the hydraulic pump that is driven by the internal combination engine to the delayed angle chamber, a check valve, which allows the flow of hydraulic fluid sent from the hydraulic pump at the hydraulic pump side position further than the relative rotation angle control valve, is interposed with respect to the control oil path, and the hydraulic fluid from the accumulator is supplied to the control oil path between the relative rotation angle control valve and the check valve by a connection oil path.

10. The valve opening and closing time control apparatus according to claim 9,
  wherein the pressure accumulation control valve is placed on the extension of a spool included in the lock control valve in a reciprocating movement direction, and the position of the spool can be switched between an intermediate lock position where fluid is discharged from the intermediate lock flow path and the locked state is provided, a duty position where fluid is supplied to the intermediate lock flow path and the unlocked state is provided, and an accumulator operation position where the accumulator is opened and operated.

11. The valve opening and closing time control apparatus according to claim 10,
  wherein the intermediate lock flow path is switched to a drain state so as to enter the locked state, when the position of the spool of the lock control valve is switched to the accumulator operating position.

12. The valve opening and closing time control apparatus according to claim 10,
  wherein the position of the spool of the lock control valve is at the intermediate lock position or the duty position, the pressure accumulation control valve is equipped with a valve body that is able to inject the hydraulic fluid to the accumulator, and a pressing member capable of performing the opening operation of the valve body at the accumulator operating position is provided at one end of the spool.

13. The valve opening and closing time control apparatus according to claim 11,
  wherein the position of the spool of the lock control valve is at the intermediate lock position or the duty position, the pressure accumulation control valve is equipped with a valve body that is able to inject the hydraulic fluid to the accumulator, and a pressing member capable of performing the opening operation of the valve body at the accumulator operating position is provided at one end of the spool.

14. The valve opening and closing time control apparatus according to claim 9,
  wherein a check valve is included between the hydraulic pump that is driven by the internal combustion engine and the relative rotation angle control valve, and the relative rotation angle control unit controls the relative rotation angle control valve at the delayed angle position from the automatic stop to the automatic start.

* * * * *